US009978106B2

(12) United States Patent
Lessin et al.

(10) Patent No.: US 9,978,106 B2
(45) Date of Patent: May 22, 2018

(54) MANAGING COPYRIGHTS OF CONTENT FOR SHARING ON A SOCIAL NETWORKING SYSTEM

(75) Inventors: Samuel Lessin, Palo Alto, CA (US); Michael Richter, Atherton, CA (US); Aaron Sittig, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1201 days.

(21) Appl. No.: 13/455,056

(22) Filed: Apr. 24, 2012

(65) Prior Publication Data
US 2013/0282504 A1  Oct. 24, 2013

(51) Int. Cl.
G06Q 50/00 (2012.01)
H04L 12/58 (2006.01)
G06Q 30/02 (2012.01)
G06Q 50/18 (2012.01)
G06F 17/30 (2006.01)

(52) U.S. Cl.
CPC ............ *G06Q 50/01* (2013.01); *G06Q 30/02* (2013.01); *G06Q 50/184* (2013.01); *H04L 51/32* (2013.01); *G06F 17/3089* (2013.01)

(58) Field of Classification Search
None
See application file for complete search history.

(56) References Cited

U.S. PATENT DOCUMENTS

| 7,672,833 | B2 | 3/2010 | Blume et al. |
| 7,756,895 | B1 | 7/2010 | Emigh |
| 7,822,631 | B1 | 10/2010 | Vander Mey et al. |

(Continued)

FOREIGN PATENT DOCUMENTS

| JP | 2006-236165 A | 9/2006 |
| JP | 2007-193427 A | 8/2007 |

(Continued)

OTHER PUBLICATIONS

PCT International Search Report and Written Opinion, PCT Application No. PCT/US2013/036048, dated Jul. 30, 2013, ten pages.

(Continued)

*Primary Examiner* — Steven S Kim
*Assistant Examiner* — Jason B Fenstermacher
(74) *Attorney, Agent, or Firm* — Fenwick & West LLP

(57) ABSTRACT

A social graph may be modeled as a collection of claims. Each claim is associated with an author, an audience, and an assertion about a fact. Probabilistic information may be collected from various sources for a claim, enabling a social networking system to evaluate a truthfulness of the assertion made in the claim. User-declared profile information may be evaluated as claims. A user, entity, or application may make claims about any assertions made in the social networking system. Reputation scores may be determined for users based on evaluations of their historical assertions. Claims may be evaluated for truthfulness using a probabilistic prediction model using heuristics analysis, regression analysis, and machine learning methods. A claims-based profile of users may be provided to viewers based on the contexts in which the claims were made. Viewers may view claims made about users, such as the users' biographical information, contact information, expertise, and interests.

8 Claims, 9 Drawing Sheets

(56) References Cited

U.S. PATENT DOCUMENTS

| | | |
|---|---|---|
| 8,195,522 B1 | 6/2012 | Sonne et al. |
| 8,364,467 B1 | 1/2013 | Bowman et al. |
| 8,478,735 B1 | 7/2013 | Archambault et al. |
| 8,775,356 B1 | 7/2014 | Chen et al. |
| 9,009,082 B1 | 4/2015 | Marshall et al. |
| 2002/0124053 A1 | 9/2002 | Adams et al. |
| 2003/0046097 A1 | 3/2003 | LaSalle et al. |
| 2004/0205065 A1 | 10/2004 | Petras et al. |
| 2004/0215793 A1 | 10/2004 | Ryan et al. |
| 2005/0114672 A1* | 5/2005 | Duncan .................. G06F 21/10 713/182 |
| 2006/0042483 A1 | 3/2006 | Work et al. |
| 2007/0266097 A1* | 11/2007 | Harik .................... G06Q 30/02 709/204 |
| 2007/0276676 A1 | 11/2007 | Hoenig et al. |
| 2008/0104679 A1 | 5/2008 | Craig |
| 2008/0114834 A1 | 5/2008 | Miyazaki |
| 2008/0162265 A1 | 7/2008 | Sundaresan et al. |
| 2008/0255989 A1 | 10/2008 | Altberg et al. |
| 2008/0270038 A1 | 10/2008 | Partovi et al. |
| 2008/0306959 A1* | 12/2008 | Spivack .............. G06F 17/3089 |
| 2009/0013413 A1 | 1/2009 | Vera et al. |
| 2009/0070334 A1 | 3/2009 | Callahan et al. |
| 2009/0094041 A1 | 4/2009 | Buss |
| 2009/0106822 A1 | 4/2009 | Obasanjo et al. |
| 2009/0144392 A1* | 6/2009 | Wang .................... G06Q 10/10 709/217 |
| 2009/0144609 A1 | 6/2009 | Liang et al. |
| 2009/0183179 A1 | 7/2009 | Keith et al. |
| 2009/0259524 A1 | 10/2009 | Rozenkrants |
| 2009/0265319 A1 | 10/2009 | Lehrman et al. |
| 2009/0319436 A1 | 12/2009 | Andra et al. |
| 2010/0004940 A1 | 1/2010 | Choi et al. |
| 2010/0070485 A1 | 3/2010 | Parsons et al. |
| 2010/0132049 A1 | 5/2010 | Vernal et al. |
| 2010/0144318 A1 | 6/2010 | Cable |
| 2010/0175113 A1 | 7/2010 | Borghetti et al. |
| 2010/0262477 A1 | 10/2010 | Hillerbrand et al. |
| 2010/0267374 A1 | 10/2010 | Armstrong et al. |
| 2010/0287033 A1 | 11/2010 | Mathur |
| 2010/0306010 A1 | 12/2010 | Winther et al. |
| 2010/0318571 A1 | 12/2010 | Pearlman et al. |
| 2011/0113098 A1 | 5/2011 | Walsh et al. |
| 2011/0167066 A1 | 7/2011 | Picault et al. |
| 2011/0185399 A1 | 7/2011 | Webber et al. |
| 2011/0196922 A1 | 8/2011 | Marcucci et al. |
| 2011/0219084 A1 | 9/2011 | Borra et al. |
| 2011/0314048 A1 | 12/2011 | Ickman |
| 2011/0321132 A1* | 12/2011 | Slingerland ........ H04N 21/4788 726/4 |
| 2012/0001919 A1 | 1/2012 | Lumer |
| 2012/0084362 A1 | 4/2012 | McBrearty |
| 2012/0095976 A1 | 4/2012 | Hebenthal et al. |
| 2012/0101806 A1 | 4/2012 | Davis et al. |
| 2012/0117626 A1 | 5/2012 | Yates et al. |
| 2012/0131183 A1 | 5/2012 | Heidt et al. |
| 2012/0166432 A1 | 6/2012 | Tseng |
| 2012/0166530 A1 | 6/2012 | Tseng |
| 2012/0166532 A1 | 6/2012 | Juan et al. |
| 2012/0209970 A1 | 8/2012 | Scipioni et al. |
| 2012/0278297 A1 | 11/2012 | Yin et al. |
| 2012/0311030 A1 | 12/2012 | Lin et al. |
| 2012/0317593 A1 | 12/2012 | Myslinski |
| 2012/0331567 A1 | 12/2012 | Shelton |
| 2013/0017806 A1 | 1/2013 | Sprigg et al. |
| 2013/0035946 A1 | 2/2013 | Ratan et al. |
| 2013/0138835 A1 | 5/2013 | Tegreene |
| 2013/0282810 A1 | 10/2013 | Lessin et al. |
| 2014/0067702 A1 | 3/2014 | Rathod |

FOREIGN PATENT DOCUMENTS

| | | |
|---|---|---|
| JP | 2007-304977 A | 11/2007 |
| JP | 2008-146246 A1 | 6/2008 |
| JP | 2009-289191 A | 12/2009 |
| TW | 200939714 A | 9/2009 |
| TW | 201140483 A | 11/2011 |
| TW | 201212978 A1 | 4/2012 |

OTHER PUBLICATIONS

PCT International Search Report and Written Opinion, PCT Application No. PCT/US2013/036049, dated Jul. 23, 2013, eleven pages.

Taiwan Intellectual Property Office, Office Action, Taiwanese Patent Application No. 102114698, dated Oct. 21, 2015, seven pages.

Fedorov, V., et al., "Structured Objects and Actions on a Social Networking System," U.S. Appl. No. 13/239,340, filed Sep. 21, 2011, 102 pages.

Korea Intellectual Property Office, Office Action, Korean Patent Application No. 10-2014-7032030, dated Dec. 26, 2014, five pages.

Taiwan Intellectual Property Office, Office Action, Taiwanese Patent Application No. 102114702, dated Dec. 2, 2014, nine pages.

Taiwan Intellectual Property Office, Office Action, Taiwanese Patent Application No. 102114698, dated Feb. 13, 2015, nine pages.

Australian Government, IP Australia, Examination report No. 1 for standard patent application, dated Jul. 25, 2017, three pages.

Canadian Intellectual Property Office, Office Action, Canadian Patent Application No. 2,869,670, dated Jan. 18, 2017, three pages.

Japan Patent Office, Office Action, Japanese Patent Application No. 2015-509006, dated Mar. 1, 2017, twelve pages.

Taiwan Intellectual Property Office, Office Action, Taiwanese Patent Application No. 102114698, dated Aug. 8, 2017, ten pages.

Zhou, L. et al., "An Exploratory Study into Deception Detection in Text-based Computer-Mediated Communication," *Proceedings of the 36th Hawaii International Conference on System Sciences (HICSS'03), IEEE Computer Society*, 2002.

Shankman, P., "Customer Service: New Rules for a Social Media World," Que Publishing, Pearson Education, Inc., 2011, one hundred ten pages.

United States Patent and Trademark Office, Before the Patent Trial and Appeal Board, Decision on Appeal, Appeal No. 2017-003367, U.S. Appl. No. 13/455,050, dated Sep. 28, 2017, thirteen pages.

United States Patent and Trademark Office, Before the Patent Trial and Appeal Board, Examiner's Answer, U.S. Appl. No. 13/455,054, Nov. 16, 2017, fourteen pages.

\* cited by examiner

US 9,978,106 B2

MANAGING COPYRIGHTS OF CONTENT FOR SHARING ON A SOCIAL NETWORKING SYSTEM

BACKGROUND

This invention relates generally to social networking, and in particular to evaluating assertions made in a social networking system.

In recent years, social networking systems have enabled users to share information about themselves, their friends, and their interests and preferences in real-world concepts with other users and entities, such as their favorite movies, musicians, celebrities, soft drinks, hobbies, sports teams, and activities. Users may include biographical information about themselves, such as where they grew up, what colleges and universities they attended, where they have worked, and so forth. A social graph of nodes interconnected by edges may be created through these interactions between users, entities, and other nodes on social networking systems. The edges representing interactions between the nodes have been assumed to be based on absolute truth and have been generated from the perspective of the user. In this way, a user may express interests and share information with other users and entities in social networking systems.

While social networking systems have provided tools for users to share information about themselves, this information has been accepted as an absolute truth, even where some uncertainty may exist in the statements. For example, a user may state that he or she is from Dallas, Tex., when in fact the user is from a nearby suburb of Dallas, Tex. As a result, the social networking system provides inaccurate information about the hometown of the user to other users of the social networking system. This may lead to ineffective targeted advertising directed towards the user based on inaccurate information. Further, the user experience is diminished because of the inaccurate information being provided.

Specifically, social networking systems have not provided tools or mechanisms for handling the uncertainty of statements made in building the social graph of interactions between users, entities, and interests. Accurate information about users, their connections with other users, and entities on social networking systems, as well as their interests and preferences provides a better user experience while enabling third-party developers to more accurately target users and better build applications that seek to drive traffic and increase engagement with their websites. Advertisers also benefit from accurate information in marketing interest-based goods and services to users of the social networking system. However, existing systems have not provided efficient mechanisms of identifying and evaluating assertions made by users in building a social graph.

SUMMARY

A social graph, which records the actions of users in a social networking system, may be modeled at least in part as a collection of claims. Each claim is associated with an author, an audience, and content that represents an assertion. Probabilistic information may be collected from various sources for a claim, and a social networking system may then evaluate a measure of truthfulness of the assertion made in the claim. This evaluation may depend on a subjective point of view such that different users have a different measure of truthfulness about the same claim or about an assertion made in the claim. In various embodiments, a user, entity, or application may make assertions in the social networking system, and these may be modeled as claims. Reputation scores may be determined for users based on evaluations of their historical assertions. Claims may be evaluated for truthfulness, from the perspective of a particular viewer, using a probabilistic prediction model that employs, for example, heuristics analysis, regression analysis, and/or machine learning methods. The modeling of these interactions as claims enables many applications in a social networking environment. For example, a contacts application may provide profile information about users of the social networking system to viewers based on the contexts in which the claims about the users' profile information were made.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Traditional Social Graph with Nodes and Edges

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

Social networking systems have previously modeled interactions, relationships, and other social information using a social graph, which includes nodes connected by edges. Nodes may include users, entities, and objects of the social networking system, such as web pages embodying concepts. Edges represent a particular interaction between two nodes, such as when a user creates a new connection with another user or expresses an interest in a web page about a new movie. The social graph may record interactions between users of the social networking system as well as interactions between users and objects of the social networking system by storing information in the nodes and edges that represent these interactions. Custom graph objects and graph actions may be defined by third-party developers as well as administrators of the social networking system to define attributes of the graph objects and graph actions. For example, a graph object for a movie may have several defined attributes, such as title, actors, directors, producers, year, and the like. Custom graph objects and graph actions are further discussed in a related application, "Structured Objects and Actions on a Social Networking System," U.S. patent application Ser. No. 13/239,340, filed on Sep. 21, 2011, hereby incorporated by reference.

Figure 1A:
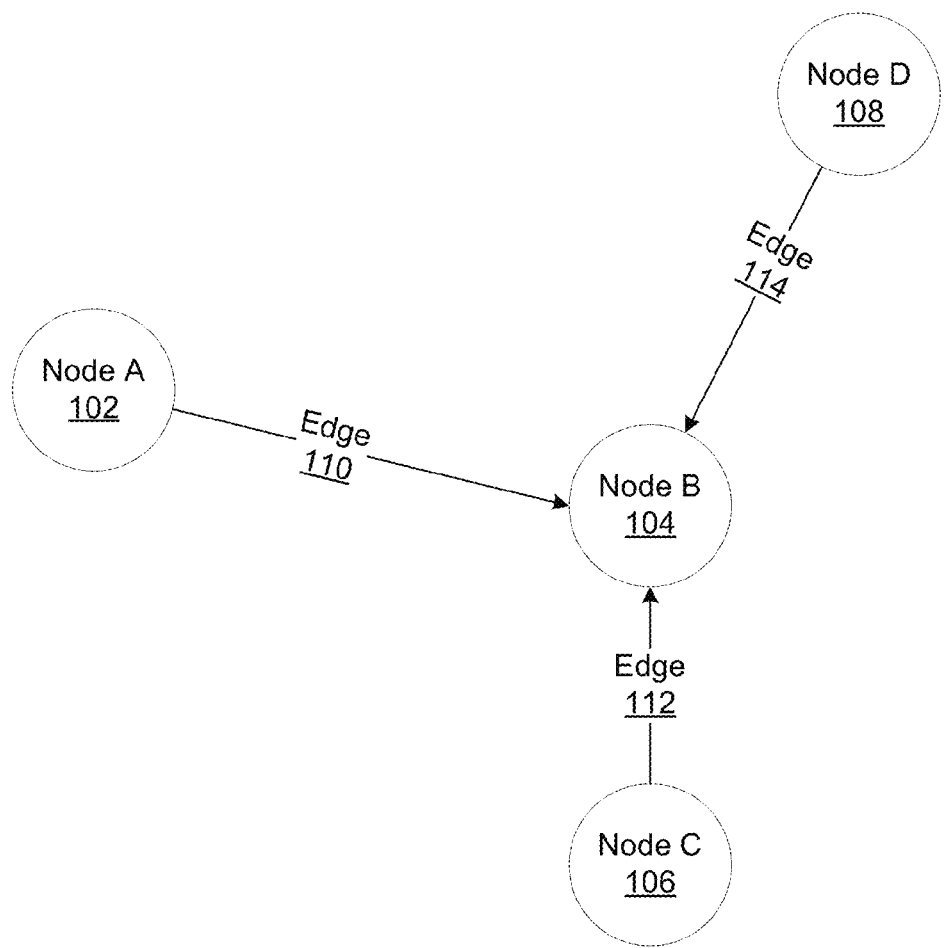
FIG. 1A is a high level block diagram illustrating a prior art process of modeling user interactions on a social networking system onto a social graph of nodes and edges.
Figure 2:
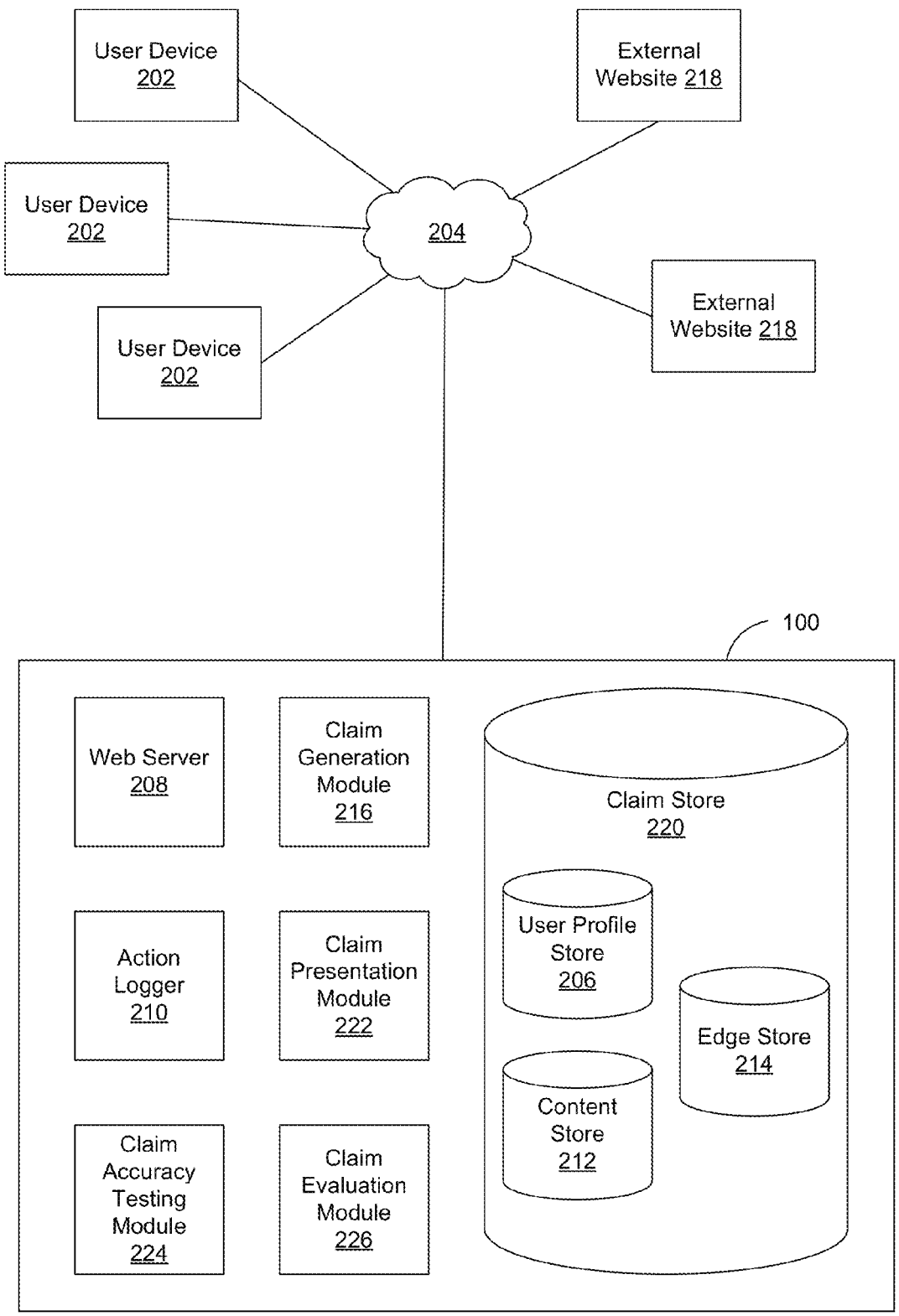
FIG. 2 is a network diagram of a system for evaluating claims in a social networking system, showing a block diagram of the social networking system, in accordance with an embodiment of the invention.

As illustrated in FIG. 1A, node A 102, which may represent a user of the social networking system 100 (as depicted in FIG. 2), may perform an action in the social networking system 100, such as clicking on a "like" link on another node B 104, which may represent another user, entity, or object of the social networking system 100, such as a page for Lady Gaga. This action creates an edge 110. Similarly, a node C 106 and a node D 108 may also perform actions on the social networking system 100, such as sharing a link, commenting on a photo, establishing a connection to another node B 104, and the like. In FIG. 1A, node C 106 and node D 108 may generate edges 112 and 114 with node B 104 through interactions such as clicking on a "like" link on the node B 104. As a result, the social networking system 100 may assume that node A 102, node C 106, and node D 108 are all interested in node B 104 and may aggregate the "likes," or expressions of interest, as a result. Applications on the social networking system 100 may query the total number of "likes" in order to approximate how interested users may be in other users, entities, and concepts on the social networking system 100. In this prior art system of structuring the social graph, the fundamental building blocks of the social graph rely heavily on this actor-actee relationship to create nodes and edges. Two different users of the social networking system 100 would see the same the total number of "likes" for a Lady Gaga page on the social networking system 100.

Claims Overview

Instead of or in addition to modeling the social graph using nodes and edges, the social networking system 100 may be structured on top of a collection of claims made by users and entities of the social networking system 100. A claim, as stored as a data structure in the social networking system 100, includes some or all of the following components:
Author
Owner
Assertion
Audience
Copyrights
Metadata associated with the claim by the social networking system A user may make a number of "claims" on a social networking system, such as having attended a certain college, working for a certain company, being raised in a certain location, or being friends with other users of the social networking system. Claims on a social networking system include other declared user profile information, such as where the user currently lives and other biographical information about the user, including the age, gender, hometown, dating interests, relationship status, languages spoken, religious beliefs, and political views, as well as other information, including contact information, work and education experience, family members, historical events posted to a timeline, and favorite quotes.

Claims may be "authored" by "agents" of the social networking system 100, such as users, entities, and application authorized to act on behalf of an agent. An author agent 118 may designate an "owner" to assign ownership of a claim. An owner agent 128 may specify certain settings for a claim, such as whether the claim may be copied by other agents and whether the claim may be boosted in rankings by other agents. Copyrights 132 may be set by the owner agent 128 through an interface with the social networking system 100 to set a user-payload bit 134 to allow other agents to copy the payload of the claim into a new claim.

Each claim includes an "assertion" that includes a "payload" of content that is written to the social graph. The payload of content is the core of an assertion. In one embodiment, the payload may be formed as a subject which is an object the assertion is describing. In another embodiment, the payload may be formed as a target, which can be an object, a compound of objects, or a binary. In a further embodiment, the payload may comprise a verb which describes a relationship between a subject and a target, where the relationship can be an object or a compound of objects. In yet another embodiment, the verb may never comprise a binary. A claim may have a claim type, just as edges have edge types. For example, a claim that a user currently lives in San Francisco has a claim type of current city. The claim type may be assigned as a metadata object by the social networking system 100.

Figure 1B:
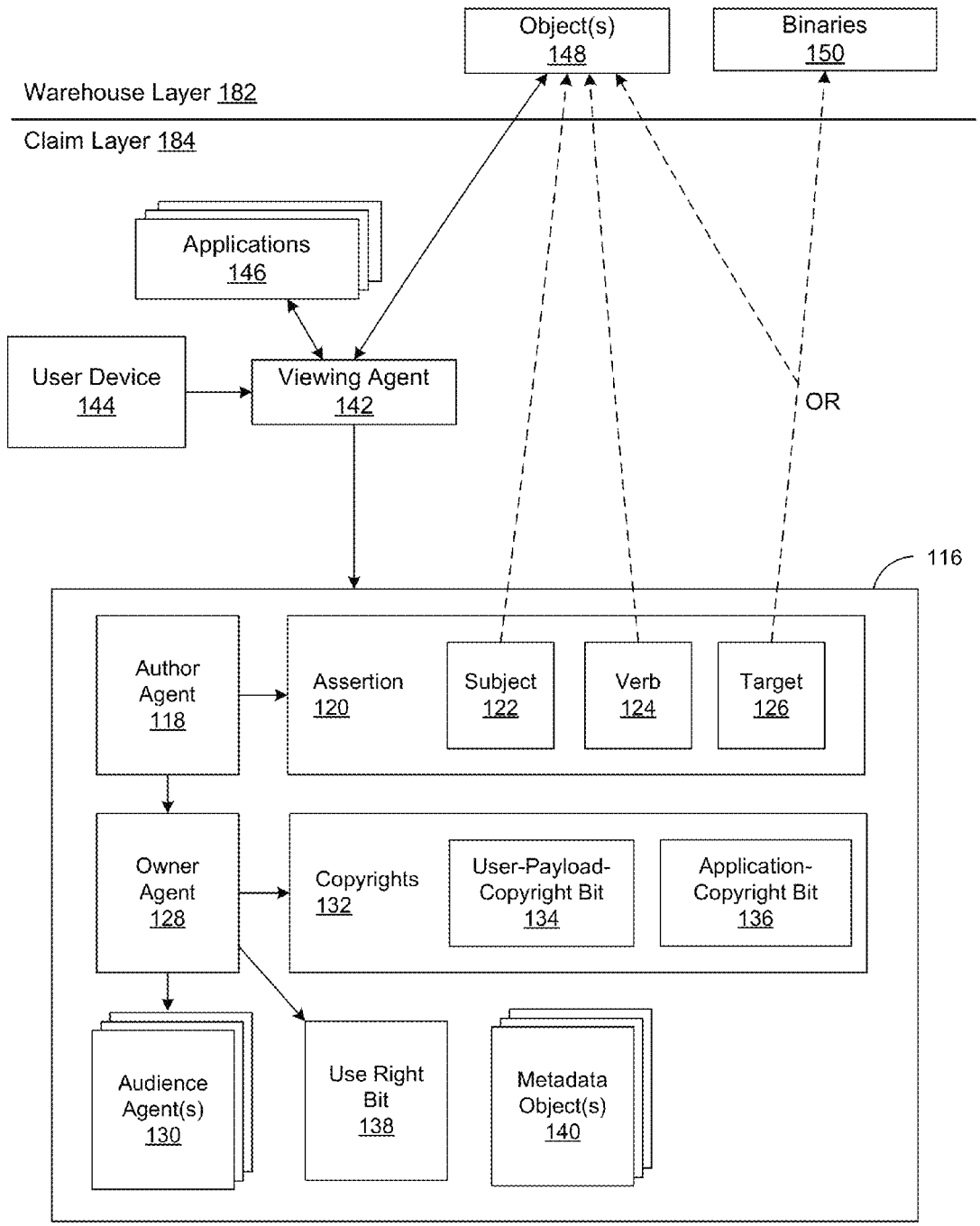
FIG. 1B is a high level block diagram illustrating a process of providing structure for claims in a social networking system, in accordance with an embodiment of the invention.

As illustrated in a high-level block diagram depicted in FIG. 1B, a claim object 116 may be represented as a data structure that includes an author agent 118, an assertion 120 that may further include a subject 122, a verb 124, and/or a target 126, an owner agent 128, copyrights 132 that may further include a user-payload bit 134 and an application-copyright bit 136, audience agent(s) 130, a use right bit 138, and metadata object(s) 140. A viewing agent 142 may be represented in the social networking system 100 as an object 148 and may be associated with a user device 144. Applications 146 may be authorized by a viewing agent 142 to author claims on behalf of the viewing agent 142. As depicted in FIG. 1B, a claim object 116 may include an assertion 120 that includes a target 126 that stores content in binaries 150 or as one or more objects 148.

A claim object 116 may be created by an author agent 118, read by an audience agent 130, synced by the social networking system 100 to any device or service with which the social networking system 100 has a relationship or can guarantee will not break the privacy model, payload-copied by any audience agent 130 conditional to the copyrights 132 where being payload-copied creates a new claim under the audience agent's authorship with the payload as the target, and deleted by the owner agent 128 or by the author agent 118 in the case that the author agent 118 is an audience agent 130 (where the author agent 118 "can see" the claim 116). A claim object 116 may have an assertion 120 that is updated by the author agent 118, creating a new claim that copies all of the other claim fields, and updates all reference to the old claim to point at the new one. The privacy of a claim 116, or the selection of audience agents 130 that may view the claim 116, may be updated by the owner agent 128 of the claim 116. Similarly, the copyrights 132 of a claim may be updated by the owner agent 128 of the claim 116, changing the ability of audience agents 130 and applications 146 working on behalf of audience agents 130 to "copy" the payload of the claim 116. The payload of the claim 116 may also be described as the assertion 120 of the claim object 116, in one embodiment. In addition, the use right bit 138 of a claim 116 may be updated by the owner agent 128 of the claim 116, changing the ability for the claim 116 to be "boosted" in search results or other claim ranking algorithms.

Each of the above claims in the aforementioned examples may or may not be factually true, and the actual truth may not be knowable or even exist. Moreover, different users will have a different measure of the truth of an assertion in a claim based on the information known to the user. To address the subjective nature of claims, the social networking system may gather information related to the claim from other objects on the social networking system. In effect, the social networking system 100 may determine one or more "truth coefficients" for a claim object 116 based on information about a viewing agent 142, the author agent 118, the owner agent 128, and/or the audience agents 130 of the claim object 116. The one or more truth coefficients may be stored as metadata objects 140 by the social networking system 100 for the claim object 116. Embodiments for evaluating claims and using the evaluated claims to provide information to users are described below in further detail in the description of FIGS. 2-5.

Components of a Claim

As illustrated in FIG. 1B, the social networking system 100 includes a warehouse layer 182 and a claim layer 184. The warehouse layer 182 is comprised of objects 148 and binaries 150, providing foundational services that are not directly usable by users of the social networking system 100. Objects 148 have unique identifiers/uniform resource identifiers, are not owned, can be created and referenced by the claim layer, and cannot be destroyed. Binaries 150, or binary storage, comprise "blobs" or files, such as photos, video, text, and the like. Binaries 150 are not owned and cannot be directly put into the social networking system 100. Binaries 150 are created as the target 126 of a claim 116. Binaries 150 cannot be referenced directly and can only be referenced via the claim layer.

The claim layer 184 of the social networking system 100 sits on top of the warehouse layer 182 and serves as the interface down to the storage/object model of the warehouse layer 182. The claim layer 184 of the social networking system 100 provides an identity model for items stored in the warehouse layer 182 and provides processes for validating actions on the warehouse layer 182. Other services of the social networking system 100, such as the social graph of nodes and edges discussed above, may fit on top of the claim layer 184.

In one embodiment, the entire claim structure can be stored as an object on a social graph and associated with a unique URL or identifier. The claim data structure can be created, read, updated, synched, payload copied, or deleted by its author agent 118. In one embodiment, the general form of a claim is: CLAIM (Author|Assertion (Subject, Verb, Target)|Owner|Audience|Copyrights (User-Payload, Application)|Use Rights|Metadata).

In one example, a claim in a social networking system may include any user generated content, such as a status update, photo, video, link, message, or comment. In another example, a claim in a social networking system 100 may include any action or connection with an object in a social graph whether the object is on or off the social networking system 100, such as liking a product on an e-commerce website external to the social networking system 100, listening to a record album through an external music streaming application, reading a book on a electronic book reading application and/or device, playing a game operating on the social networking system 100, and so forth.

In yet another example, "friending" or forming a connection between two agents, users, entities, or nodes in the social graph can be described as a claim that an initiating agent is "friends with" the target agent. The privacy of that claim may be limited to the initiating agent and the target agent unless the claim is reciprocated by the target agent. "Friend lists" may be generated by agents that may be structured as claims in the social networking system 100. If, from the perspective of a viewing agent 142 of the social networking system 100, one cannot see an author agent's 118 friend list but can see another agent's claim of friendship with the author agent 118, then they may implicitly see the friendship-relationship. If one cannot see a friendship via any friend list, they may still be able to view actions taken on the social networking system 100 through regular privacy settings that may imply friendship. In one embodiment, an application may read claims to which it has access and re-create a derivative friend list that approximates what it can see of an author agent's 118 friend list.

Author Agents and Owner Agents of Claims

An agent may be a user of the social networking system 100 having a user profile that represents a person in the real world, an entity of the social networking system 100 having an entity profile that represents a corporation, business, celebrity, or place in the real world, an application operating on or outside of the social networking system 100 which may include third party applications that may connect to the social networking system 100 from an external system or website, a page on the social networking system 100, a group of users on the social networking system 100 in which a designated administrator acts on behalf of the group, or an event on the social networking system 100 in which a designated administrator acts on behalf of the event. In one embodiment, the social networking system 100 has validated that an agent accurately represents a person or an entity in the real world. A viewing agent 142 may author claims, or write claims to the social graph. A viewing agent 142 may also read or view claims that are accessible to the viewing agent 142 on the social graph based on whether the viewing agent 142 is designated as an audience agent 130 of the claim 116. Agents may also be created or destroyed by the social networking system 100 at will. A viewing agent 142 may also access and interact with claims through other methods of communication, such as audio and voice commands.

In one embodiment, special classes of agents may be defined for kids and minors, or users under the age of majority. These classes of agents may have explicitly limited authoring privileges on the social networking system 100, such as not being able to author claims to an audience that includes all users of the social networking system 100 or publicly available claims. In other embodiments, these classes of agents may have implicit limitations on authoring privileges, such as enabling them to choose a publicly available audience but limiting the privacy of those claims until they reach the age of majority. Additionally, a kid is initially connected to a parent, another user on the social networking system 100 and cannot "unfriend," or sever the connection to, the parent. A parent can recover a kid's password, may be able to turn off any feature which a kid has access except those where the parent can view the kid's actions, and may also view inbound friend requests such that the audience of an inbound friend request to a kid is the kid and the parent. Furthermore, agents are limited in their ability to tag minors and kids, such as suggesting that content be placed on the timeline of minors and kids unless they are at least friends of friends of the minor. Minors and kids may also be excluded from the audience of certain agents by another agent of the social networking system 100, such as a parent of the minor(s), or the social networking system 100 acting as an agent.

Agents may also block other agents, which prevents the other agents from including the blocking agent in an audience of claims owned by the other agents and prevents other agents from being included in the audience of claims owned by the blocking agent. Agents may also run "browse" queries, or queries run on claims in the social networking system 100 to return "best match" and "exact match" search results. Viewing agents 142 may also delegate capabilities to applications 146, giving the applications 146 permissions to exercise any of the capabilities that the applications 146 have, such as authoring claims on behalf of the viewing agents 142 and generating derivative claims based on the authorized authored claims.

Agents may be author agents 118, owner agents 128, and audience agents 130. An author agent 118 of a claim object 116 may, by default, be designated as the owner agent 128 of the claim 116 and be included as an audience agent 130, in one embodiment. For example, a user of a mobile application for an address book may want to record the phone number of a connected user with a privacy setting set to "only me," meaning that the user would like to keep the phone number private and accessible only to herself. A claim object 116 describing this claim of a phone number for a connected user may, by default according to the privacy settings configured by the user, designate the user as the author agent 118, owner agent 128, and audience agent 130 of the claim object 116 for the private phone number of the connected user. Through various interfaces, such as an user interface on the social networking system 100 or through one or more application programming interfaces (APIs), an author agent 118 may designate an owner agent 128 and one or more audience agents 130. Privacy control settings may be imported by the social networking system 100 to select the one or more audience agents 130 for a claim object 116, in one embodiment. Copyright and use rights preferences may also be predetermined by author agents 118 through preference settings configured in the social networking system 100 and imported by default into claim objects 116 generated by the author agents 118, in one embodiment.

In one embodiment, an author agent 118 may view claim objects 116 that have been authored by the author agent 118 from the perspective of a specific viewing agent 142 in the social networking system 100. For example, through a user interface, the author agent 118 may input the specific viewing agent 142 to view which claim objects 116, if any, are viewable by the specific viewing agent 142 based on whether the specific viewing agent 142 is included as an audience agent 130 of a claim object 116 written by the author agent 118. In another embodiment, an audience agent 130 may view a claim object 116 and copy the claim to another location, such as the timeline of the audience agent 130, the timeline of an agent connected to the audience agent 130, a message to a target agent, a communication external to the social networking system 100, or on a website external to the social networking system 100. In this way, the audience of the claim object 116 may be expanded to include a new audience as determined by the audience agent 130 copying the claim object 116.

In another embodiment, viewing agents 142 and applications 146 acting on behalf of agents may run queries over a set of claims. Because claims are structured (i.e., have structured data), the social networking system 100 may execute structured queries on a set of claim object 116 with relative ease. Queries may be executed through various interfaces with the social networking system 100, such as a user interface on the social networking system 100, a set of application programming interfaces (APIs), and as a search function included in other processes.

Author Agents

In a social networking system 100, an "author" may include any agent that has been given abilities to act in the social networking system 100 and that may carry a truthfulness score, truth coefficient, and/or reputation score. An author agent 118 is an "author" of a claim such that the assertion 120 of the claim object 116 is written by the author agent 118. The author agent 118 may write the assertion 120 of the claim object 116 being authored through one or more interfaces with the social networking system 100 as well as external systems connected to the social networking system 100, such as third party applications authorized to author claims on behalf of the author agent 118. An author agent 118 may also make derivative claims, or claims based on other claims in the social networking system 100. For example, a first author may claim that a second author claims that the second author's phone number is 867-5309. In one embodiment, the social networking system 100 may act as an author agent 118 in making derivative claims based on claims made by other agents in the social networking system 100.

An author agent 118 has the right to access all claims that the author agent 118 has made that they can see, in one embodiment, by accessing an activity log or a download of all claims data. In further embodiments, a business model for a pay-per-write/read model may implemented using claim objects 116 in the social networking system 100. An identity marketplace could charge for access to specific claims by type (or allow others to input their claims and charge for access to their information). For example, a social networking system may enable applications to pay monthly or per claim for access to read claims by a particular agent or an agent associated with a particular application or demographic. The identify marketplace or exchange of information for payment would only occur with the agents' or users' knowledge and permission.

Owner Agents

In one embodiment, each claim may have one owner agent 128. An author agent 118 of a claim object 116 is, by default, the owner agent 128, except for applications 146 authoring claims on behalf of a particular agent. In that case, the particular agent is the owner agent 128 of claims authored by the applications 146 authorized to author claims on its behalf. An author agent 118 may designate an owner agent 128 of a claim object 116 authored by the author agent 118. An owner agent 128 also determines an audience of a claim, where the audience comprises one or more audience agents 130. An owner agent 128 of a claim object 116 may specify settings for the claim object 116, such as the use-right bit 138, copyrights 132 including the user-payload-copyright bit 134 and the application-copyright bit 136. The owner agent 128 of the claim object 116 may also delete the claim, including any uploaded content, or payload, of the claim. By deleting the claim, the binaries associated with the content in the payload of the claim will be swept by the social networking system 100 and the references by the claim to the associated binaries will be deleted.

Ownership of a comment on a claim, such as a photo, is automatically transferred to the owner of the binary claim and audience. For example, a first author that uploads a photo to the social networking system 100 and a second author generates a comment on the photo, describing the photo as a wonderful shot. The second author's comment is a claim that is now owned by the first author of the original binary claim that includes the uploaded photo as well as the audience for the original binary claim.

Applications

An application 146 may be authorized to author claims on behalf of an agent, in one embodiment. As a result, the authorized application may be an author agent 118 in the social networking system 100 that assigns ownership of the claim to the authorizing agent such that the authorizing agent is the owner agent 128 of the claim object 116 authored by the authorized application. For example, gaming applications such as Cityville and Castleville may be connected to or operate on the social networking system 100, enabling agents on the social networking system 100 to play the games through the social networking system 100. The agents playing the games may authorize the gaming applications to author claims on behalf of the agents, such as publishing claims of reaching achievements in the game and generating derivative claims that the gaming agents enjoy playing casual games based on the claims that they played the gaming applications.

Applications 146 are systems to which any agents may delegate any or all of their capabilities. Applications 146 can request permissions from agents to act on their behalf in various forms. Applications 146 may request permissions to read all claims made by an agent, read only claims having a minimum privacy level, or read all claims of a specific application. Applications 146 may also request permissions to write claims with an audience that only includes the authorizing agent, permissions to write claims with an audience correlating to a specific privacy level, such as a privacy control setting predetermined by the authorizing agent, and request a one-time extra permission to write a specific claim and/or story. Applications 146 may also be given permission to perform any action an agent may perform on the social networking system 100. Applications 146 are registered on the social networking system 100 and follow documented application programming interfaces. An agent can revoke an application's permission at any time. An agent may specify which applications may have access to their data in any fashion.

Assertions: Content of Claims

Claims may include different types of assertions that include content in a social networking system 100. A claim 116 may include an assertion 120 that comprises any content of any size represented in the social networking system as a content object, from a bit indicating that a sensor in a fridge has detected that the fridge is empty to a high resolution photo uploaded from a mobile device with embedded geographic location data that has been tagged with one or more agents on the social networking system 100. Each claim 116 includes an assertion 120 that includes a "payload" of content that is written to the social graph. The payload of content is the core of an assertion. Payloads of claims may vary depending on the claim type. For example, a user claiming a relationship status with another user on the social networking system, such as engaged, is a claim in which the payload of the claim is that the users are engaged. Other types of claims include claiming a connection with another user on the social networking system, declaring an interest in a user profile on the social networking system, checking in other users at a location, tagging users in work experience or education experience, tagging agents in a photo or video, and tagging agents in a status message. The author agent 118 in the fridge example is an application connected to the sensor in the fridge that is an agent in the social networking system 100.

Additional types of claims may include declaring user profile information, declaring expertise and/or skills for a user, recommending a product and/or service represented by a page on the social networking system 100, tagging a content object, such as a photo, video, or status message, with a link to one or more users of the social networking system 100, tagging a check-in object that includes a geographic location with one or more users of the social networking system 100, a page and/or application representing a business or entity making a claim about one or more users of the social networking system 100 having performed a custom graph action on a custom graph object, and a user making an appointment or scheduling an event with one or more other users using a calendaring application on the social networking system 100. In other words, a claim may include an assertion about any content that may be stored and/or shared on a social networking system 100.

An assertion 120 of a claim comprises a subject 122, a verb 124, and a target 126, in one embodiment. In one embodiment, the payload may be formed as a subject which is an object the assertion is describing. In another embodiment, the payload may be formed as a target, which can be an object, a compound of objects, or a binary. In a further embodiment, the payload may comprise a verb which describes a relationship between a subject and a target, where the relationship can be an object or a compound of objects.

The payload of a claim may include any type of content, including structured and unstructured content. The payload of a claim may include structured elements along with structured content, such as "Michael is listening to Lady Gaga with John on Spotify." The "listening" action is a custom graph action, and the preposition "with" is a structured element that indicates another agent is performing the custom graph action with the author agent 118 of the claim. Structured content in this example includes "Michael" and "John," agents of the social networking system 100, "Lady Gaga," a custom graph object such as an artist object that may included structured information, such as the birth year of the artist and the genre of the artist, as well as connections to other custom graph objects, such as album objects representing albums recorded by the artist and song objects representing songs recorded by the artist. An application 146 authoring the claim on behalf of an agent, such as "Spotify" authoring the claim on behalf of the agent "Michael," is another example of structured content within the payload of the claim.

Another type of claim is a negative claim, such as a first user removing a tag from a photo uploaded and tagged by a second user. The tag by the second user is a claim in conflict with the removal of the tag by the first user. The assertion, in that case, is whether the first user is pictured in the photo uploaded by the second user. When an agent tags himself, herself, or itself and/or other agents in a social networking system 100, the tag represents a claim including an assertion being made to an audience. For example, a page on the social networking system 100 representing a college may make a content post comprising a photo taken on campus. The administrator of the page, a designated user of the social networking system 100, may tag a current student of the college, another user of the social networking system 100, in the post on behalf of the entity, the college's page. In this way, the entity has made a claim that the college student user is pictured in the photo posted by the page. Other types of claims, aside from posts of photos, videos, status, links, and messages, feedback from other users that includes comments and "likes," and actions such as tagging, "liking," wanting, listening, and other custom graph actions, includes sets determined by an agent, such as lists, albums, and maps of favorite places.

In this example, the application 146 authoring the claim 116 on behalf of the agent "Michael" includes functionality that recognizes that Michael listened to music by Lady Gaga in conjunction with John. A user device 144 associated with the agent "Michael" operated the "Spotify" application 146 to perform the custom graph action of "listen" in conjunction with the agent "John" who, on a separate user device 144 associated with him, operated the same application 146 to perform the custom graph action of "listen" on one or more custom graph objects that represents songs by a custom graph object that represents the artist Lady Gaga. In one embodiment, the payload of the claim object 116 may include links to each object 148 included in the payload, such as links to user profile objects for "Michael" and "John," a link to the custom graph object for "Lady Gaga," which may link to an entity profile object for Lady Gaga on the social networking system, as well as a page object for the "Spotify" application 146 authoring the claim 116. Structured information is defined on the social graph by capturing interactions by agents with objects on the social networking system 100, in one embodiment. For example, social validation and/or feedback on a posted content item, such as likes, comments, and shares, may be captured to provide structured information about the content item as well as author agents 118 of the content item, likes, comments, and shares. User interactions that occur on systems external to the social networking system 100, such as on external websites and applications, may be structured using custom graph objects and custom graph actions defined and implemented by the external systems in sharing information with the social networking system 100. By storing claims in a structured way, the social networking system 100 may provide sophisticated features, such as measuring a particular agent's interest in Lady Gaga based on number of listens using streaming music applications 146 such as Spotify, determining levels of a particular agent's influence amongst connected agents, receptiveness to advertising based on user feedback of claims that have been boosted by advertisers, and so on. The effect of structuring a social graph on top of claims, using nodes and edges that further comprise claim objects, provides the social networking system 100 with more granularity of detail in analyzing, aggregating, and interpreting information obtained about agents.

The payload of a claim may also include unstructured data, such as the amount of time spent viewing photos posted by an agent and metadata included in other claims. Unstructured data may include any data that is not structured in the social networking system 100. The payload for a claim may also include hyper-links to anything on the Internet, including timelines of other agents. A tag, or a special case of a hyper-link to target agents, may also be included in a payload of a claim because a tag is an active suggestion by the author of the claim that the content of the claim be presented on the timeline of the tagged agent. In one embodiment, the payload includes text, media, references and/or links to objects 148 in the social networking system, applications 146, other claims, agents, and any combination thereof. A claim object 116 may include an assertion 120 that includes a subject 122, a verb 124, and a target 126. These components of an assertion 120 are described in further detail below.

Subject

The subject 122 of an assertion 120 comprises an object 148 that the assertion 120 is describing. For example, a claim object 116 may represent a check-in event made by a user that he is at the Eiffel Tower in Paris. The claim may include a photo of the view from the Eiffel Tower snapped by a mobile device associated with the user. The user may create a check-in event using an application operating on the mobile device that is connected with the social networking system 100 and tag the photo with himself and a connected user. In this example, multiple claim objects 116 may be generated by the user, each having different assertions 120 and subjects 122. One claim 116 may include an assertion 120 that the user is located at the Eiffel Tower in Paris. In that claim, the subject 122 of the claim 116 is the user's current location that is stored in an object 148 in the warehouse layer of the social networking system 100.

Two other claims 116 may include assertions 120 that the photo depicts the user and the connected user as tagged by the user. The subject 122 of one of the claims comprises the user being depicted in the photo. The subject 122 of the second claim comprises the connected user being depicted in the photo. For each of these two claims, the subject 122 of the assertion 120 is a user profile object in the social networking system 100, an object 148 in the warehouse layer of the social networking system 100.

As another example, an application may author a claim, on behalf of an agent, that reads "Michael listened to Lady Gaga on Spotify." A claim 116 may be generated with an assertion 120 that includes the subject 122 of "Michael," an agent in the social networking system 100 represented by an object 148 in the warehouse layer, because the claim is about Michael listening to Lady Gaga. In another embodiment, another claim 116 may be generated with an assertion 120 that includes the subject 122 of "Lady Gaga," another agent in the social networking system 100 represented by a different object 148 in the warehouse layer, because that claim is about Lady Gaga being listened to by an agent. In a further embodiment, yet another claim 116 may be generated with an assertion 120 that include the subject 122 of the exact song listened to by Michael, represented by a custom graph object.

In another embodiment, a claim object 116 may include an assertion 120 that only includes a subject 122 and a verb 124. For example, a user may declare on the social networking system 100 to be born on Mar. 15, 2011. One claim that may be generated from that self-declaration includes an assertion 120 formed by the subject 122 that includes the user making the self-declaration, represented by an object 148 and a verb 124 that includes a reserved verb "IsPerson" that signifies that the user is a person. In that case, the target 126 of the claim is also the user declaring to be born on Mar. 15, 2011. The target 126 in that claim points to the user profile object for the user, an object 148 in the social networking system 100.

Verb

A verb 124 in an assertion 120 of a claim 116 describes the relationship between the subject 122 and the target 126 in the assertion 120. A verb 124 may comprise an object 148 or an object 148 that is a compound of objects. In one embodiment, the verb 124 of an assertion 120 of a claim 116 is never stored as a binary 150 in the warehouse layer of the social networking system 100. Returning to the example where the user tagged a photo of the view from the Eiffel Tower with a tag of himself and a connected user, the subject 122 of the assertion 120 in the claim object 116 may include the other user tagged in the check-in event and the verb 124 of the assertion 120 in the claim object 116 may include a reserved verb such as "IsWith." The user may also tag a face in the uploaded photo as the tagged user. In this case, the user is claiming that the uploaded photo depicts the tagged user such that the verb 124 of the assertion 120 in the separate claim object 116 includes a different reserved verb such as "IsTaggedInPhoto," for example. The social networking system 100 may have reserved verbs that describe actions that may be taken in the social networking system 100, such as "HasPhoto(s)," "HasText," "Commented on <OBJ-ID>," "Liked," "AT," "HasName," "HasMember," "NameIS," "FriendsWith," "HasPhotoSameAs," and the like.

Returning to the example in which an application may author a claim on behalf of an agent, a claim that reads "Michael listened to Lady Gaga on Spotify," the verb 124 is "listened," the target 126 is "Lady Gaga," the author agent 118 is the application "Spotify," and the owner agent 128 is the agent "Michael" represented by an object 148 in the warehouse layer, in one embodiment. The custom graph action "listen," stored as an object 148 in the warehouse layer, is designated as the verb 124 of the assertion 120 of that claim 116. In this way, claims may be generated using custom graph actions and custom graph objects in addition to reserved actions (verbs) and other objects 148 in the social networking system 100.

Target

A target 126 of an assertion 120 of a claim object 116 may comprise an object 148, a binary 150, or a compound of objects 148 which is an object 148. The target 126 of an assertion 120 of a claim 116 represents content that is related to the subject 122. Returning to the above example, the custom graph object "Lady Gaga" is stored as the target 126 of the assertion 120 for the claim object 116. As a result, the target 126 of that claim points to an object 148, specifically a custom graph object for "Lady Gaga," an artist object stored as an object 148 in the social networking system 100, in one embodiment. In another embodiment, "Lady Gaga" may be an agent in the social networking system 100, stored as another object 148 in the warehouse layer.

Returning to the example above in which a user uploads a photo at the Eiffel Tower, the photo, the location coordinates uploaded by the mobile device, and text written by the user may be stored in binaries 150 as the payload, which includes a target 126, of the assertion 120. A claim object 116 may also include an assertion 120 that includes a subject 122 and a verb 124 that are stored as objects 148. Returning to the example, the user uploading a photo of the view from the Eiffel Tower may also tag himself with another user of the social networking system 100. In that case, the user is claiming that he is with the other user at the Eiffel Tower.

In a further embodiment, a claim object 116 may include an assertion 120 that only specifies a target 126. For example, a claim object 116 may include an assertion 120 that includes a target 126 that points to a compound of objects, including older claim objects 116, about a topic in the social networking system 100, such as Whitney Houston. In that case, the claim object 116 that only specifies a target 126 to a compound of objects may copy the subject 122 of the compound of objects, Whitney Houston, as the subject 122 for the claim. For example, the compound of objects may be a group of songs performed by the artist Whitney Houston and purchased by other users of the social networking system 100.

All activity that occurs on the social networking system 100 and activity operating outside of the social networking system that is reported through applications may be described using claim objects 116 that have assertions 120 which include targets 126. Posts, including messages, may be described as claims with payload targets. For example, a status update post, which includes text written by an agent, may be stored as a claim object 116 owned and authored by the agent writing the status update post having an assertion 120 that includes a subject 122 that references the object 148 of the status update, a verb 124 of "HasText," and a target 126 that references a binary 150 associated with the text. Similarly, a photo upload post, which includes a digital photo uploaded to the social networking system 100 by an agent, may be described as a claim object 116 owned and authored by the agent uploading the photo having an assertion 120 that includes a subject 122 that references the object 148 of the photo, a verb 124 of "HasPhoto," and a target 126 that references a binary 150 associated with the photo.

An application making a post on behalf of an agent, such as "Sam" on a social networking system 100 may be described in a claim object 116 in which the author agent 118 is "Sam: ViaApp" and an assertion 120 having a subject 122 that points to the object 148 for the photo, a verb 124 of "HasPhoto," and a target 126 of a binary 150 on the social networking system 100. An application making a post on behalf of the same agent "Sam" on a system external to the social networking system 100 may be described in a similar claim object 116 in which the author agent 118 is "Sam: ViaApp" and an assertion 120 having a subject 122 that points to the object 148 for the photo, a verb 124 of "HasPhoto," except where the target 126 of the claim object 116 includes a link to an external binary.

A comment on a post may be stored as a claim object 116 having an assertion 120 in which the commenting agent is the subject 122, the verb 124 being "Commented on <OBJ-ID>" and the target 126 being the binary 150 of the object 148 stored at <OBJ-ID> in the warehouse layer of the social networking system 100. In making the comment on the post, the commenting agent transfers ownership of the post to the owner of the binary claim. As a result, the claim object 116 representing the comment has the owner agent 128 as the owner of the <OBJ-ID>.

Edges may be described as claims with targets that only point to objects 148 on the social networking system 100. For example, if an author agent 118 named "Paul" uploaded a photo onto the social networking system 100, another author agent 118 named "Sam" may click on a link to "like" the photo, or express approval and/or interest in the photo. A claim object 116 for Paul's claim may include an assertion 120 having a subject 122 of the object 148 of the photo, a verb 124 of "HasPhoto," and a target 126 of the binary 150 associated with the photo. A claim object 116 for Sam's claim that he liked Paul's photo may include an assertion 120 having a subject 122 of an object 148 associated with Sam, a verb 124 of "Liked," and a target 126 pointing to an identifier of the object 148 of Paul's claim. The claim object 116 for Sam's claim that he liked Paul's photo includes the same privacy setting of Paul's claim, importing the listing of audience agents 130 from Paul's claim into Sam's claim.

Another type of edge includes a comment on a content item posted on the social networking system 100. Continuing the example above, where Paul posted a photo to the social networking system 100 and set the privacy of that claim to Paul's friends on the social networking system 100, two claim objects 116 may be generated based on a comment by Sam on Paul's photo. One claim object 116 may include an assertion 120 that includes a subject 122 that points to an object 148 representing Sam as an agent in the social networking system 100, a verb 124 of "CommentedOn," and a target 126 of the object 148 for Paul's photo. That claim object 116 may have the owner agent 128 set to the owner of the claim object 116 for Paul's photo and have the privacy imported from that same claim object 116 for Paul's photo. Another claim object 116 may include an assertion 120 that includes a subject 122 that points to the object 148 representing the first claim object 116 for Sam's comment on Paul's photo, a verb 124 of "HasText," and a target 126 that points to the binary 150 that stores the comment posted by Sam. Additionally, an edge may include a "like" of a comment on a content item on the social networking system 100. A claim object 116 that describes that type of edge may include an assertion 120 that includes a subject 122 that points to the object 148 for Sam as an agent on the social networking system 100, a verb 124 of "Liked," a reserved verb in the social networking system 100, and a target 126 pointing to an identifier of the binary 150 for the comment.

Another type of edge in the social networking system 100 may include a check-in event, or any post in the social networking system 100 that includes a location such as a status update, a photo upload, a video upload, an event, and the like. A claim object 116 for that type of edge may include an assertion 120 that includes a subject 122 that points to an object 148 for Sam as an agent of the social networking system 100, a verb 124 of "AT" which indicates being located at a place, and a target 126 that points to an object 148 for a particular location, such as "Nuthouse," a dive bar in Palo Alto, Calif. A metadata object 140 may be associated with that claim object 116 that includes the latitude and longitude of the check-in event received from the user device associated with the agent Sam.

Another type of edge may be generated by an agent of a social networking system 100 that indicates that a certain object is the same as another object in the social networking system 100, such as duplicative pages for fans of Justin Bieber. In one embodiment, an agent of a social networking system 100 may provide information to the social networking system 100 indicating that one or more objects are equivalent. In that case, the claim object 116 for that action would include an assertion 120 that includes a subject 122 that points to the first object 148, a verb 124 of "IS" that indicates equivalence, and a target 126 that point to the second object 148.

Lists may be generated by an agent on the social networking system 100, such as organizing lists of audience agents 130, lists of favorite restaurants, lists of favorite topics, and so on. A generated list may be described as a claim object 116 that includes an assertion 120 having a subject 122 that points to the object 148 for the list, a verb 124 of "HasName" that indicates that the list has a name, and a target 126 pointing to the name of the list as stored as an object 148. Another claim object 116 for a list may include an assertion 120 having a subject 122 that points to the object 148 for the list, a verb 124 of "HasMember" that indicates that the list has a member, and a target 126 pointing to the object 148 for the agent that is included in the list, for example. In one embodiment, a list may be described as a name payload and a set of edges in the social networking system 100. In another embodiment, an application 146 may be used to generate lists on the social networking system 100, generating multiple claim objects 116. A first claim object 116 describing a claim of a list generated by an application 146 may include an assertion 120 that includes a subject 122 that points to the object 148 representing the list, a verb 124 of "NameIS" that indicates the name of the list, and a target 126 that points to the identifier of the path of the object created by the application 146. A second claim object 116 describing a claim of a list generated by an application 146 may include an assertion 120 that includes a subject 122 that points to the object 148 representing the list, a verb 124 of "HasMember" that indicates the list includes a member, and a target 126 of an object 148 representing an agent that is included in the list.

Friendship, or users connecting with each other on the social networking system, may be described as a reserved verb of reciprocated claims authored by the users connecting with each other. Suppose Sam requests to be friends with Paul on the social networking system 100. A friendship request may be captured as a claim object 116 in the social networking system 100, such that the claim object 116 includes an assertion 120 having a subject 122 that points to the object 148 representing the requesting agent, Sam, a verb 124 of "friends with" that indicates a claim of being friends with another agent, and a target 126 that points to the object 148 the target agent, Paul. A notification of the friendship request may be in the form of a browse query, or a query of all claims, in which a search term includes claims that have the verb "friends with" and the target of the object 148 representing Paul, the target agent. Paul may then accept the friendship request from Sam which may be captured as another claim object 116 that has an assertion 120 that includes a subject 122 pointing to the object 148 for Paul, a verb 124 of "friends with" and a target 126 pointing to the object 148 for Sam. The visibility, accessibility, or audience of the friendship request is set, by default, to only include the requesting agent and the target agent until the friendship request is accepted, making the claims of friendship reciprocal. Reciprocal claims of friendship may be public or limited to the privacy settings of the requester and/or target agent.

An agent may request to boost a story and/or search results of a query for stories referencing a topic, such as running This request may be described as a claim using a reserved verb for copying a payload of an original claim and boosting the original claim. For example, a claim object 116 for boosting a specific claim may include an assertion 120 having a subject 122 pointing to an object 148 for the agent requesting the boost, a verb 124 of "pays <X> to boost" where <X> represents a fee negotiated by the social networking system 100 to boost the claim, and a target 126 pointing to the object 148 of the claim that is to be boosted. Similarly, a claim object 116 for boosting the search results of a query referencing a topic may include an assertion 120 having a subject 122 pointing to an object 148 for the agent requesting the boost, a verb 124 of "pays <X> to boost" and a target 126 referencing an object 148 representing the search results of the browse query.

Audiences: Context of Claims

An audience is a context in which a claim is made. An agent may make a claim about other agents, such as "Bob is a good cook!" and "Joe likes cooking." The author agent 118 may control the size of the audience of this claim by designating audience agents 130 that comprise the audience, such as making this claim accessible to the public (including both users and non-users of the social networking system), to a certain group of connected agents, to the subject agent's connections, or only to selected agents. In another embodiment, an audience may be determined by the social networking system 100 based on the agents selected to receive the claim. For example, a first agent may send a message to a second agent stating that a third agent is a good cook on the social networking system 100. Because the third agent is not included in the audience of the claim made by the first agent, the third agent may not view the claim made by the first agent.

One or more audience agents 130 may be set by an owner agent 128 of a claim 116. An audience agent 130 is an agent of the social networking system 100, represented by an object 148 in the warehouse layer of the social networking system 100, that can access, or view, the claim's authorship, ownership, audience, assertion, and/or copyrights. An owner agent 128 may define a set of agents to be audience agents 130 as part of one or more privacy settings, or privacy control settings, configured in the social networking system 100. The social networking system 100, acting as an agent, is included as an audience agent 130 in every claim object 116 on the social networking system 100. An author agent 118 of a claim object 116 has the right to access all claims they have made that they can see, meaning any claim in which the author agent 118 has been designated as an audience agent 130 of the claim. All agents have the right of access made about them that they can see. Interfaces may be provided on the social networking system 100 to access this information, such as a user interface that provides for display the accessible claims on the social networking system 100 and an application for downloading the accessible claims information. A claim may also be deleted by an owner agent 128 that controls the audience of the claim. An author of a claim may delete the claim if the author is part of the audience of the claim. Deleting a claim will remove the claim from the social networking system in a reasonable amount of time, making the claim inaccessible.

Audience agents 130 may be selected by an owner agent 128 through various methods, such as in-line selection, pre-selection, delegation, and at-will limitation by the social networking system 100. In-line selection refers to the owner agent 128 can select an audience at the time of posting the claim 116, where the owner agent 128 is also the author agent 118 of the claim 116. Pre-selection refers to the owner agent 128 pre-selecting an audience, such as determining a privacy list of agents to be included in the audience, where the owner agent 128 is also the author agent 118 of the claim 116. Delegation refers to the instance where the owner agent 128 is not the author agent 118 in which the author agent 118 designates the owner agent 128 and the audience agent(s) 130 must be pre-selected by the owner agent 128. The social networking system 100 may also limit the ability and/or options of a given agent to make claims in any way, such as by limiting the audience agents 130 of claims 116 authored by minor agents. In another embodiment, the audience of a claim may be a direct enumeration of agents or a reference to a pre-defined list of agents. In a further embodiment, the mode of audience selection (in-line, pre-selection, and delegation) may be defined in the product interface of the social networking system 100.

Copyrights, Use Rights, and Metadata Objects

As mentioned above, an owner agent 128 of a claim object 116 may specify settings for the claim object 116, such as the use-right bit 138, copyrights 132 including the user-payload-copyright bit 134 and the application-copyright bit 136. These bits help define the audience of the claim and the permissions of the audience to copy claims into new claims. Note that the social networking system may synchronize claims to other devices and/or services connected to the social networking system 100 regardless of the copyrights 132 set by the owner agent 128 without compromising the privacy model of the social networking system 100. The social networking system 100 is not limited by the one or more copyrights 132 defined by the owner agent 128 for synchronizing the content stored on the binaries, such as copying a claim, caching, device syncing, and the like to provide better an enhanced user experience on the social networking system 100. The copyrights 132 of a claim object 116 pertain to the permissions of audience agents 130 to copy an assertion 120 included in the claim object 116 into a new claim object 116.

User-Payload-Copyright Bit

Content within a claim object 116 may be "owned" by an owner agent 128 in the sense that the owner agent 128 may control how the content is distributed and is accessed by other agents in the social networking system 100 as well as in systems external to the social networking system 100. For example, an author agent 118 may upload a video from a mobile device to the social networking system 100. The social networking system 100 enables agents to store content, such as video, pictures, and the like, by providing binaries used for storage. When a content item is uploaded, an object 148 is generated in the social networking system 100, in one embodiment. In another embodiment, the content item is stored in the binaries 150 as created by being a target 126 of the assertion 120 of the claim object 116. The claim object 116 that is generated may include one or more copyright bits to enable the owner of the content included in the claim object 116 to determine the ways in which the claim may be copied. A user-payload-copyright bit 134 controls if a user can copy the binary 150 of a claim 116 into a new claim. The 'binary' of a claim includes the non-referenceable storage provided by the social networking system 100 to store the uploaded content. For example, if a first author agent 118 uploads a picture to the social networking system 100, the claim object 116 for the picture would include an assertion 120 that includes a target 126 for the picture uploaded to binaries 150. The first author agent 118 may set the audience of the claim to be public, or set to Everyone, such that all agents on the social networking system 100 have been designated as audience agents 130 and the user-payload-copyright bit 134 is set to "OFF," meaning that no rights to copy the content have been reserved and audience agents 130 may freely copy the claim 116 by the first author agent 118. A second author agent 118 may subsequently copy the claim 116 by the first author agent 118 into a new claim object 116 where the new claim object 116 references the original claim object 116 as the target 126 of the assertion 120 of the new claim object 116. The verb 124 of the assertion 120 of the new claim object 116 may be "HasPhotoSameAs," a reserved verb in the social networking system 100 for claims that copy other claims. The user-payload-copyright bit 134 of the new claim object 116 that copied the original claim also references the user-payload copyright bit 134 of the original claim. If the original claim is deleted by the owner agent 128 of the claim, then the copyright control is either turned "OFF" or frozen in its last place.

Application-Copyright Bit

An application-copyright bit 136 controls if an audience agent 130 of the claim 116 can authorize an application to copy the claim on their behalf. For example, an application 146 may be authorized to share content on behalf of an agent, such as a photo-sharing application that shares photos from an event taken and uploaded by the agent using the application. In this example, the author agent 118 is the application and the owner agent 128 is the agent that authorized the application to generate the claims. The owner agent 128 may enable other agents listed in the audience to copy the claim into a new claim. An audience agent 130 may then authorize the application 146 to share the photos uploaded by the agent (also the owner agent 128) with a system external to the social networking system 100, thereby copying the claim of the author agent 118, where the author agent 118 is the application 146 authorized to generate claims on behalf of the owner agent 128. In one embodiment, the authoring agent may enable members of the audience to copy the claim by authorizing an application to copy the claim on their behalf by setting the application-copyright bit to "OFF." The social networking system 100 is not limited by the one or more copyright bits 132 defined by the owner agent 128 for synchronizing the content stored on the binaries, such as copying a claim, caching, device syncing, and the like to provide better an enhanced user experience.

Use-Right Bit

In one embodiment, a use-right bit 138 enables a claim to be "boosted" by the social networking system 100 in search results for the claim. For example, an agent that represents a restaurant may pay the social networking system 100 to boost positive recommendations made by other agents in the search results of a query made by a searching agent. The recommendations made by the other agents are claims in which the default setting of the use-right 138 bit is set to "ON" such that the agent representing the restaurant may boost those recommendations. An owner agent 128 of a claim 116 may disallow the claim from being boosted by turning off the use-right bit 138 through an interface with the social networking system 100, such as a user interface and an application programming interface. In one embodiment, the boost request may be a function that operates on one or more claims. An agent may pay the social networking system 100 to boost a specific story or a query for claims, such as all claims that reference an object 148 for Coca-Cola, an agent on the social networking system 100.

Metadata Objects

Metadata objects 140 may be included, or appended to, a claim object 116 by a social networking system 100 such that the metadata object 140 are private and only viewable and editable by the social networking system 100. For example, a social networking system 100 may append a bit that tracks whether the claim object 116 was posted on an agent's timeline profile in the social networking system 100. The "ON TL" bit is an example of a metadata object 140. Other examples of metadata objects 140 include device information, publication surface, and other information generated by the social networking system 100 that is private and viewable only by the social networking system 100.

Multiple Claims about a Subject in a Social Networking System

Having described the components of a claim object 116 in detail, the potential interactions between claim objects in a social networking system 100 is now described in further detail. In particular, the social networking system 100 may rely on the components of claim objects 116, as described above, about multiple subjects in presenting information about a particular subject in the social networking system 100 to a viewing agent 142.

Figure 1C:
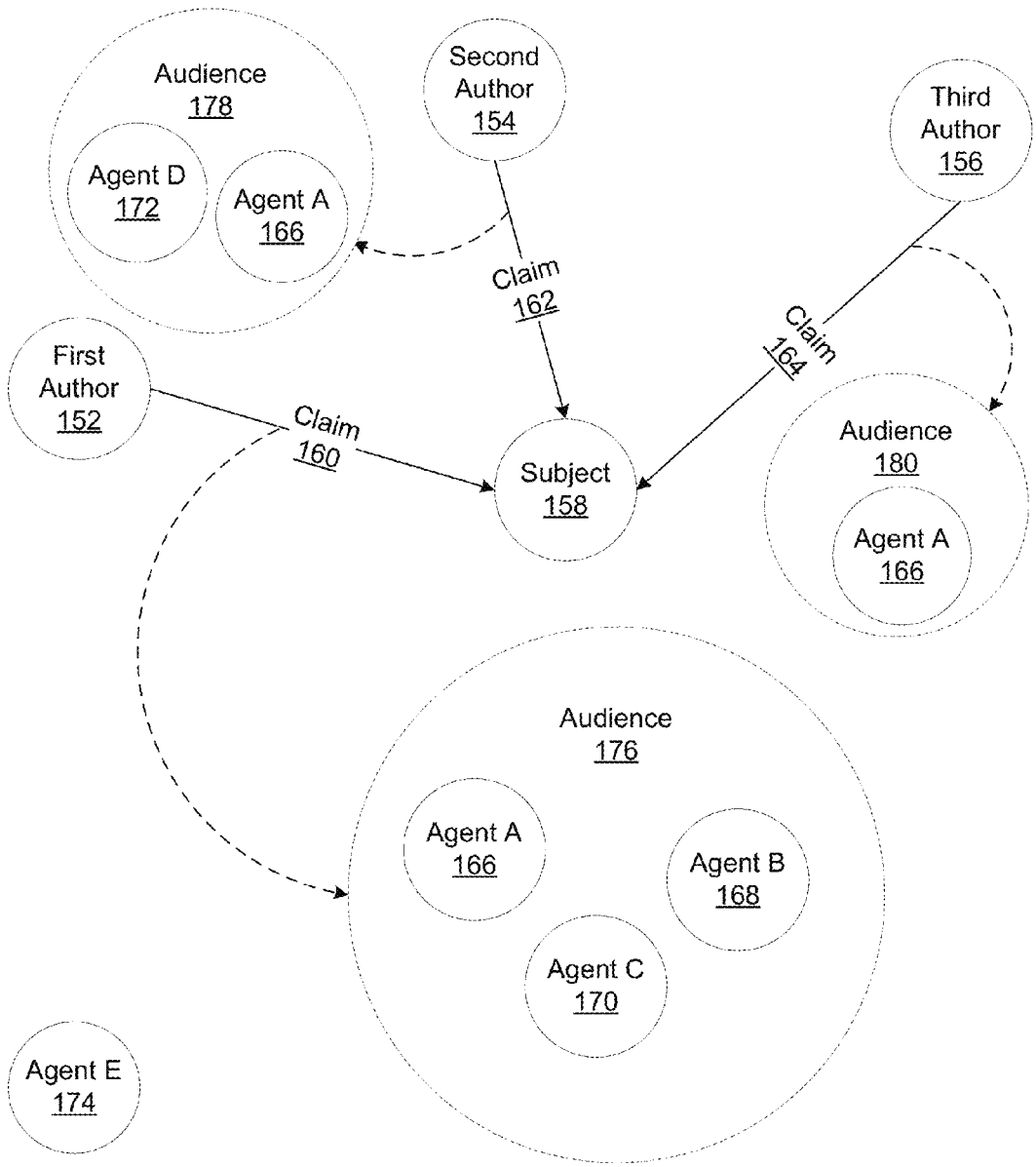
FIG. 1C is a high level block diagram illustrating a process of modeling interactions on a social networking system as a collection of claims, in accordance with an embodiment of the invention.

FIG. 1C illustrates a high level block diagram of a process of modeling interactions on a social networking system as a collection of claims, in one embodiment. As defined above, an author may make a claim, or a statement having a subjective truthfulness value or a truth coefficient, to an audience in a social networking system 100. The claim comprises an assertion that includes a payload of a subject, a verb, and a target. A simple claim that may be made by an author in the social networking system 100 is where the author, a user in the social networking system 100, currently lives. This may be inputted into the social networking system 100 as the user fills out his or her user profile. However, other agents in the social networking system 100, which may include users and entities, may make other claims about where that user currently lives. These claims may be made to differing audiences that include different agents. By using claim objects that designate audiences, different claims may be made about the same subject that include different audiences such that the claim presented to a viewing agent depends on which one or more of the audiences that viewing agent is a member.

As illustrated in FIG. 1C, three author nodes made claims that include assertions about a subject. A first author 152 may make a claim 160 about a subject 158, such as a user (the first author 152) declaring in his profile that he currently lives in San Francisco, Calif. The first author 152 may make this claim 160 about the subject 158 of currently living in San Francisco, Calif. to an audience 176 that includes agent A 166, agent B 168, and agent C 170. A second author 154 may make a different claim 162 about the subject 158 of where the user (the first author 152) currently lives, such as claiming that the user lives in Daly City, Calif., a suburb of San Francisco, Calif. A third author 156 may make another claim 164 about the subject 158 of where the user (the first author 152) currently lives, such as claiming that the user lives in Pacifica, Calif., another suburb of San Francisco, Calif. In another embodiment, a second author 154 may make a claim 162 that matches the claim 160 of the first author 152 that the user currently lives in San Francisco, Calif. In another embodiment, the third author 156 may make a claim 164 that matches the claim 162 made by the second author 154, asserting that the user currently lives in Daly City, Calif. Each of the claims 160, 162, and 164 may have different audiences 176, 178, and 180 attached to the claims 160, 162, and 164.

As a result of three authors 152, 154, and 156 making three different claims 160, 162, and 164 of where a user (the first author 152) currently lives, a viewing agent 142 of the user profile of the first author 152 on the social networking system 100 may access one or more of the different claims 160, 162, and 164 based on whether the viewing agent 142 is included in one or more of the audiences 176, 178, and 180. For example, if the viewing agent 142 is agent A 166, included in the audience 176 for claim 160 made by the first author 152 that he currently lives in San Francisco, Calif., then the viewing agent 142 may be provided with that claim 160 that the user currently lives in San Francisco, Calif. However, because the viewing agent (agent A 166) is also included in the audiences 178 and 180 for the claims 162 and 164 made about the subject 158 of where the first author 152 currently lives, the social networking system 100 may also provide access to the claims 162, and 164 made about the subject 158. In this way, the viewing agent 142 may see that the first author 152 claim that he lives in San Francisco, Calif., the second author 154 claims that the first author 152 lives in Daly City, Calif., and the third author 156 claims that the first author 152 lives in Pacifica, Calif. Presented with this information, the viewing agent 142 is better informed about the actual city which the first author 152 lives in. In one embodiment, the social networking system 100 may enable the viewing agent 142 to select the city which he or she believes the first author 152 currently lives in, in effect creating a new claim by the viewing agent 142.

Affinity scores, or calculated scores determined by the social networking system 100 that measure an affinity between objects, such as agents, may be used in ranking viewable claims about a subject. Suppose that agent A 166 is a close friend of the first author 152 and only weakly connected to the second author 154 and the third author 156. In that case, agent A 166, as the viewing agent 142, may be provided with the claim 160 for the subject 158 based on the close connection to the first author 152. Regardless of affinity scores, the social networking system 100 may heavily rank claims that have been authored by a viewing agent 142 in presenting claims to the viewing agent 142. Suppose that the first author 152 has made the claim 160 about the subject 158 to everyone on the social networking system 100 and that agent A 166 is the third author 156. In this case, the social networking system 100 provides the claim 164 to the viewing agent 142 (agent A 166) that the agent A 166 has made as the third author 156, about the subject 158 that the first author 152 currently lives in Pacifica, Calif., even though the second author 154 has made a claim 162 that is different from the claim 164 made by the third author 156 because the social networking system 100 may heavily weight a claim made by an author in providing a claim to the author.

Other information received by the social networking system 100 may affect the ranking of multiple claims about a subject presented to a viewing agent 142. In another example, the social networking system 100 may have received a different claim that the second author 154 is married to the first author 152. The first author 152 may reciprocate the claim that he is married to the second author 154. As a result, claims made by the second author 154 about the first author may be given more weight by the social networking system 100 in the ranking In that case, the agent A 166, as the viewing agent 142 and the third author 156, may be provided with the claim 162 that the first author 152 currently lives in Daly City, Calif. authored by the second author 154 that is ranked higher than the claim 164 authored by the viewing agent 142 (agent A 166). In yet another embodiment, the social networking system 100 may provide a "best" claim made in relation to the subject 158 to the viewing agent 142 based on the ranking of claims made in relation to the subject 158 and based on the audiences 176, 178, and 180 that the viewing agent 142 is a member.

The "payload" of a claim, or the claim's content, may only be viewed by an agent if the agent has been designated as an audience agent 130 of the claim. As a result, different agents in a social networking system 100 may view different "truths" based on their membership in the audiences of claims. For example, if agent B 168 and agent C 170, both included in audience 176 of the claim 160 made by the first author 152, are viewing the user profile of the first author 152, they would be provided with San Francisco, Calif. as the current city in which the first author 152 lives. In contrast, agent D 172 viewing the same user profile of the first author 152 would be provided with Daly City, Calif. as the current city in which the first author 152 lives. Agent E 174, who is not included in any audiences 176, 178, or 180 of the claims 160, 162, and 164, may view the user profile of the first author 152 and be provided with a blank field for the current city where the first author 152 lives. In another embodiment, instead of the blank field, the social networking system 100 may generate a claim of where the first author 152 lives based on check-in events made publicly available by the first author 152. In this way, the social networking system 100 provides one or more claims to a viewing agent 142 about a subject based on the audiences in which the viewing agent 142 is included as well as the social connections of the viewing agent 142 to authors of the claims made about the subject using the components of the claim objects 116 for the one or more claims.

This simple example of a user declaring where he currently lives on a user profile in the social networking system 100 illustrates that the social networking system 100 may use received information about agents in presenting claims to a viewing agent. The discussion above equally applies to more complex examples of claims made in a social networking system 100, such as claims about interests, connections between agents, content posted by agents, check-in events, event attendance, restaurant recommendations, custom graph actions such as listening to music, playing a game, going to a concert, buying a new wardrobe, and the like. Due to the subjective nature of claims, the social networking system 100 may determine one or more truth coefficients for claims, further described in the following sections.

System Architecture

FIG. 2 is a high level block diagram illustrating a system environment suitable for evaluating claims in a social networking system, in accordance with an embodiment of the invention. The system environment comprises one or more user devices 202, the social networking system 100, a network 204, and external websites 218. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, a content store 212, an edge store 214, a claim generation module 216, a claim store 220, a claim presentation module 222, a claim accuracy testing module 224, and a claim evaluation module 226. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates an action log with information about user actions, in an effort to track them. Such actions may include, for example, adding a connection to another user, sending a message to another user, uploading an image, reading a message from another user, viewing content associated with another user, attending an event posted by another user, and loading a profile page of another user, among others. In addition, a number of actions described in connection with other objects are directed at particular users, so these actions are associated with those users as well.

As described and illustrated in FIG. 1B above, the social networking system 100 includes a warehouse layer 182 and a claim layer 184. As illustrated in FIG. 2, a claim store 220 is a conceptualized database that stores claim objects 116. The claim store 220 resides in the claim layer 184 of the social networking system 100 and points to storage and objects that are in the warehouse layer 182. Claim objects 116 represent claims made by agents in the social networking system. Because claim objects 116 are fundamental to all objects on the social networking system 100, a user profile store 206, an edge store 214, and a content store 212 may reside, conceptually, within the claim store 220. For example, a user profile object for a user may be defined as a claim object 116 that includes the assertion that the social networking system 100 has generated an agent that corresponds to the user. Likewise, edge objects and content objects may be similarly defined as claim objects 116.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users.

The content store 212 stores content objects, such as photos, videos, status updates, and content items shared with users of the social networking system 100. Content objects may comprise claim objects 116 that represent agent actions on the social networking system 100. For example, a user may upload a photo from his mobile device to the social networking system 100. Location information embedded in the photo saved in an exchangeable image file format (EXIF) may be used to validate the location of the user who claims to live in San Francisco, Calif. Other types of content objects, such as pages on the social networking system 100 that represent interests of users of the social networking system 100, places, businesses and other real-world entities, as well as external websites 218, are stored in the content store 212. User interactions with content objects are stored in edge objects in the edge store 214.

A claim generation module 216 generates claim objects 116 based on actions performed in a social networking system 100 as well as on external websites 218. In one embodiment, certain user actions, such as declaring profile information attributes such as age, current living situation, relationship status, and the like, may trigger the claim generation module 216 to automatically generate claim objects 116 for the user-declared assertions. In another embodiment, the claim generation module 216 may provide a user interface for users to make claims about other objects in the social networking system 100, such as claiming the best phone number of another user, claiming the physical addresses of a number of people, claiming that another user is a good co-worker, claiming that a restaurant has good chicken wings, and claiming appointments made through events inputted into the social networking system 100.

A claim presentation module 222 provides to a viewing agent claim objects 116 that are accessible by the viewing agent based on whether the viewing agent is included in the audiences indicated in the claim objects 116. In one embodiment, the claim presentation module 222 provides claim objects 116 associated with a subject, such as a user of the social networking system 100, a page of the social networking system 100 representing an entity, and a concept or keyword that may be included in communications made by users of the social networking system 100 and extracted into an object on the social networking system 100. The claim presentation module 222 may provide information included in a claim 116 about a subject user being a great pastry chef, for example, including a photo of a cake made by the subject user, to viewing agents included in the audience of the claim 116.

As another example, an author may claim that the best dry fried chicken wings are served at Mission Chinese Restaurant to an audience by leaving a recommendation for a page representing Mission Chinese Restaurant in the social networking system 100. A viewing agent of the page representing Mission Chinese Restaurant may be provided with the claim from the author if the viewing agent is included in the audience of the claim. Different recommendations, which may conflict, may be provided to a viewing agent based on claims made by authors in which the viewing agent is included in the audiences of the claims. Note that a different viewing agent, who is not included in the audience of the claim by the author that the best dry friend chicken wings are served at Mission Chinese Restaurant, cannot view that claim. The administrators of the page for Mission Chinese Restaurant may also not be able to view claims if they are not included in the audience of the claims.

A concept being discussed by users on a social networking system 100, such as "Barack Obama" after the State of the Union address, may generate claim objects 116 in which authors discussing the speech may be claiming statements about Barack Obama, such as whether he is a good speaker, how the President addresses the issues, and so on. The claim presentation module 222 may provide these claims about the President, the State of the Union address, and/or politics to users included in the audience, in one embodiment.

A claim accuracy testing module 224 may provide a user interface to users of the social networking system 100 that prompts users to verify claims made in the social networking system 100. In one embodiment, the claim accuracy testing module 224 may prompt a viewing agent for the accuracy of a claim based on a truth coefficient in the claim. The claim accuracy testing module 224 may provide a user interface for prompting the viewing agent for the accuracy of a claim. In that instance, the social networking system 100 may use user feedback or confirmation about the claim in determining the claim's truth coefficient, or truth coefficient, of the claim. The process of determining a truth coefficient is discussed in greater detail below.

As an example, the claim accuracy testing module 224 may provide a user interface to a viewing agent of the social networking system 100 that prompts the viewing agent whether a connected user graduated from Harvard. The response to the prompt may provide the social networking system 100 with more accurate information that may be trusted. In another example, the claim accuracy testing module 224 may prompt a viewing agent for the accuracy of a claim made about the viewing agent, where the claim designates an audience which the viewing agent is a member of, based on a determined truth coefficient of the claim. In another embodiment, the claim accuracy testing module 224 prompts a viewing agent for the accuracy of a claim only in a special circumstance defined by the social networking system 100 that does not violate the privacy settings of subject agents of the claim. The special circumstance may be defined based on a determined truth coefficient of the claim, retrieved information about the subject agent, retrieved information about the viewing agent, and any combination thereof. As a result, the claim accuracy testing module 224 enables viewing agents to provide more information to the social networking system 100 with regard to specific claims.

A claim evaluation module 226 retrieves information from various sources, such as user profile objects stored in a user profile store 206, entries from an action log generated by an action logger 210, edge objects stored in an edge store 214, content objects stored in a content store 212, external data gathered from external websites 218, and user feedback claim data generated by a claim accuracy testing module 224. Using the information retrieved from these sources, the claim evaluation module 226 may generate a truth coefficient in the claim being made by an agent of the social networking system 100. In another embodiment, the claim evaluation module 226 may generate a truth coefficient for an author based on information retrieved from these sources and use the truth coefficient for the author as the truth coefficient for claims made by the author. Different models for evaluating claims may be used based on the type of the claim. Heuristics analysis and machine learning may, in one embodiment, be used in refining these models for evaluating claims. By evaluating claims and determining one or more truth coefficients for each claim, the social networking system 100 may use the truth coefficients in ranking claims when presenting them to viewing agents.

Evaluating Claims on a Social Networking System

Because multiple claims having different assertions about a particular subject may be made in a social networking system 100, such as a best phone number for a particular agent, a social networking system 100 may determine a truth coefficient for claims using one or more methods. These methods of evaluating claims include determining a truth coefficient for an author agent based on information retrieved about the author agent, determining a truth coefficient for a claim made by an author agent to a particular audience, and determining false claims that may be falsely made by an author agent to an audience. A brief overview of each of these evaluation methods is presented, followed by example cases of evaluating a single claim, evaluating multiple claims, determining false claims, and determining a truth coefficient based on retrieved information from one or more sources.

Moreover, because any statement made on the social networking system 100 is a subjective assertion of a fact based on a particular viewpoint, there is no absolute truth of any statement made on the social networking system 100. The social networking system 100 may approximate the truthfulness of a statement based on other claims, but any evaluation of "truth" or "likelihood" is made from a particular point of view, such as a viewing agent's point of view, or perspectives of other users connected to a subject user. As a result, a claim evaluation module 226 may have one or more models to determine the truthfulness of a claim.

In one embodiment, a truth coefficient may be determined for each agent making a claim about the subject. In another embodiment, a truth coefficient may be determined for each claim about the subject made by the agent of the social networking system 100. Affinity scores may be determined by a social networking system 100 through one or more separate processes, described further in a related application, "Contextually Relevant Affinity Prediction in a Social Networking System," U.S. patent application Ser. No. 12/978,265, filed on Dec. 23, 2010, hereby incorporated by reference. One or more factors used by the social networking system 100 in determining affinity scores may be used in generating models for determining truth coefficients.

Probabilistic models may be used to determine truth coefficients, in one embodiment. As a result, the truth coefficient of a claim may be a calculated probability that the claim is true. In another embodiment, the initial probability of a claim being true, or its truth coefficient, is set at some percentage, say, for example, 50%. Over time, the truth coefficient may change based on the information gathered about the claim.

In an embodiment, the social networking system 100 may determine a truth coefficient for a viewing agent 142 based on information gathered about the author agent 118 of the claim object 116 with respect to the viewing agent 142. For example, a truth coefficient for an author agent 118 may be computed based on past interactions with the viewing agent 142, such as a determined affinity score of the viewing agent 142 for the author agent 118. A truth coefficient model for an author agent 118 may include several inputs, such as past social validation (a viewing agent's 142 past likes, comments, and shares of the author agent's 118 claim objects 116), an implied truth coefficient imported from friends of friends, factors used in determining affinity scores for objects in the social networking system 100, manual inputs of truth coefficients by the author agent 118, and negative inputs, such as overwritten claims by target agents in response to claims by the author agent 118, a numeric representation of the number of agents that have a minimum threshold truth coefficient for the author agent 118, and bad information included in claim objects 116 by the author agent 118 that has been validated by one or more other agents in the social networking system 100. A negative truth coefficient may also be determined for a claim having an assertion based on negative feedback received from the viewing agent about the author of that claim, such as the viewing agent removing a tag by the author, the viewing agent choosing a conflicting claim over the claim by the author, and other agents of the social networking system providing negative feedback about the author when making claims to a particular audience.

In another embodiment, the claim evaluation module 226 may determine a truth coefficient for an assertion about a subject based on one or more claims by one or more authors making the assertion. A truth coefficient may be determined for each of the claims by the one or more authors making the assertion using the method described above of using an affinity of the viewing agent for the author in generating a truth coefficient for each claim. Then, the truth coefficients for the claims may be combined using a weighted function to determine a truth coefficient for the assertion for the viewing agent. In one embodiment, the viewing agent's affinities for the authors are used as weights. In another embodiment, the truth coefficients of the claims including the assertion made to the one or more audiences are inputted into a weighted function to determine the truthfulness of the assertion. The weighted function may also include other factors, such as truth coefficients for the authors, conflicting claims related to the assertion, and other claims related to the assertion. In a further embodiment, the truth coefficient for the assertion is computed by adding the truth coefficients received for the claims having the assertion.

Truth coefficients may be used by the social networking system 100 in various ways. For example, a viewing agent 142 may filter claims made in a user interface based on the determined truth coefficients for the viewing agent 142 for the claims. In another embodiment, claims may be ranked by determined truth coefficients. In a further embodiment, conflicting claims may be ranked using truth coefficients such that only a "best" claim, the claim with the highest truth coefficient, is displayed to the viewing agent 142. Complex queries may be run against claims that include, as a search term, the truth coefficient for a particular set of viewing agents 142, in an embodiment. In further embodiments, an assertion 120 may be highlighted by the social networking system 100 based on the truth coefficient determined for the assertion 120. Highlighted assertions 120 in this manner may be exported to a third party application in which advertisers may make payments to the social networking system 100 for access to the highly truthful information, conditioned on the privacy model of the social networking system 100. In this way, a new social graph may be modeled on claims that account for the gradients of truthfulness for assertions made on the social networking system.

Truth Coefficients Determined for Agents

The methods of determining truth coefficients may be categorized as either determining a truth coefficient for an author or determining a truth coefficient for each claim, in one embodiment. Reputation scores for truthfulness, or agents' truth coefficients based on the viewing agent's perspective of the agent, may be determined by the claim evaluation module 226 based on the agents' past history of making claims. A truth coefficient may be determined for any combination of components of a claim object. For example, a model may be used to determine a truth coefficient for an author making claims to a particular audience about a particular subject. As a result, all claims made to that particular audience by the agent about that particular subject may be assigned the truth coefficient determined by the social networking system 100. Separately, a different model may be used to determine a truth coefficient for an author making claims to any audience about a particular subject. In that case, all claims made about the particular subject may be assigned the determined truth coefficient using the different model.

A social networking system 100 may generate a truth coefficient for an author separate from a different truth coefficient for a particular claim made by the author. Truth coefficients may be used to determine an overall truth coefficient for an author. Thus, in one embodiment, a truth coefficient may be determined for an agent based on the truth coefficients for all claims made by the agent. The truth coefficient determined for that agent may then be used by the social networking system 100 in ranking claims presented to a viewing agent.

In a further embodiment, a truth coefficient may be determined for an agent based on other claims related to the claims made by the agent as well as other information received by the social networking system about the agent. For example, as illustrated in FIG. 2, the claim accuracy testing module 224 may prompt an agent for feedback about claims about that agent. This enables agents to provide more assertions, or more claims, about a particular claim. Using that information, the truth coefficient for an agent may be affected by the feedback received. For example, if an agent confirms a claim when prompted by the claim accuracy testing module 224, the reputation of the author of the claim, or the truth coefficient for the author, may increase. However, if an agent denies a claim or chooses another claim, the reputation of the author of the claim may be diminished, meaning the truth coefficient for the author may decrease.

Agents may carry a reputation that is determined by the claim evaluation module 226. In another embodiment, a reputation score for an agent may be determined by a separate process in the social networking system 100 and operate asynchronously from the claim evaluation module 226. In that embodiment, the claim evaluation module 226 may retrieve the stored reputation score for the agent making the claim being evaluated. The claim evaluation module 226 determines a reputation score measuring the truthfulness of claims made by a particular agent with respect to a viewing agent's perspective on the social networking system 100.

An initial value may be assigned for an agent's reputation score. The initial value may be adjusted up or down based on user feedback received from users affirming or disaffirming the agent's reputation for truthfulness. A reputation score for an agent may also be based on a viewing agent's social connections using a reputation model that averages evaluated claims authored by the agent. The reputation score may then be used as a truth coefficient for the agent. As a result, the social networking system may rank claims by the agent based on the truth coefficient for the agent.

For example, a first user may make the claim that he is married to a second user on the social networking system 100. In one embodiment, a first viewing agent may make a conflicting claim that the first user is not married to the second user, such that the claim made by the first user would not be provided to the first viewing agent. A second viewing agent, unaware of the first user's tendency to make false claims on the social networking system 100, may be provided with the first user's claim that he is married to the second user based on the second viewing agent's social connections on the social networking system 100. In effect, the agent reputation score for a user may be determined as an average of the truth coefficients for claims made by the user taking into account a viewing agent's social information, such as affinity scores for authors of the claims, in one embodiment. A user's reputation for truthfulness may then be stored as an agent reputation score in a viewing agent's user profile object for the user, in one embodiment.

Factors used to determine affinity scores may be used to determine a reputation score for an agent, such as determining whether an agent is generating spam or malware on the social networking system 100. Such factors include monitoring interactions between agents on the social networking system 100 within a predefined time period, such as the last 12 hours, the last 24 hours, the last week, month, two months, three months, and so on. Interactions between agents include comments, "likes" (expressions of approval and/or interest), posts on a "wall" associated with an agent, interactions on a same thread, agents tagged in the same photo, a second agent linking to a comment by a first agent, sharing content, mentioning an agent in a wall comment, viewing a user profile or entity's page on the social networking system 100, messages exchanged between agents, chats between agents, video chats, a "poke" (an indication that an agent requests the attention of another agent on the social networking system 100), initiating a two-way connection to another agent on the social networking system 100 such as "friending" a user or becoming a "fan" of a page, severing a relationship with a connected agent, being "checked-in" at the same location as another agent, attending the same event as another agent, viewing an album uploaded by another agent, posting content in a group in which another agent is a member, sharing membership in a group with another agent, subscribing to another agent to enable a one-way connection with that agent on the social networking system 100, and declaring attendance to a same school, local city, workplace, family member, or stated relationship with another agent. One factor for determining affinity scores, as well as whether an agent is a malicious actor, includes measuring the amount of time between interactions between agents and the social networking system 100. Factors for determining malicious agents may include excessive posts by an agent, excessive initiations of two-way connections by an agent, and analyzing information declared by agents for matches with known malicious actors. These factors may be used by the claim evaluation module 226 in determining reputation scores for agents.

Heuristics analysis may also be used to keep track of the assertions made by users and discount assertions made by users that have a low reputation score based on previous assertions made by those users. Based on prior fraudulent assertions, a user's reputation score may be decreased. In one embodiment, a user's reputation score will cause a truth coefficient for a claim being generated by the user to be automatically discounted if the user's reputation score did not meet a predetermined threshold reputation score.

In one embodiment, an agent may manually determine its own reputation score through an interface with the social networking system 100, such as a user interface, an application programming interface (API), or other communication method with the social networking system 100. In another embodiment, an author may assign a reputation for truth score for the author based on different times of the day or during a particular time period. Between the hours of 8 pm and midnight, an authoring user may assign himself a truth coefficient of 0.8, for example. In further embodiment, the social networking system 100 may assign a truth truth coefficient for all claims by an author to be a score of 1, meaning that the social networking system 100 may assume that all claims made by an author are believed to be true by the author.

Truth Coefficients Determined for Claims

Truth coefficients may be determined for claims using models that include one or more factors. A claim evaluation module 226 generates a model to score confidence in claims made on the social networking system 100. In one embodiment, a model uses weights for factors in the model, and, over time, the weights may be adjusted using machine learning methods. Regression analysis, in one embodiment, may be used in the model to include or exclude factors that are determined to be relevant or not relevant to evaluating claims in the social networking system for a particular viewing agent, based on machine learning and heuristics analysis of the associated claim objects. In one embodiment, a different scoring model may be generated to score confidence in claims made by a particular author to a particular audience about a particular assertion. In that scoring model, truth coefficients for all claims made about the particular assertion may be combined using a truth function to determine the truth coefficient in the claim made by the particular author. Different types of truth functions may be determined for different types of assertions made to different audiences, having different subjects, and based on any attribute that may be used to distinguish content, users, entities, and agents in the social networking system 100. Truth coefficient models may be weighted differently based on received information by the social networking system 100 regarding claim types. As a result, a correction of a business address for an entity may have different weights than agents tagging a photo with other agents.

In other embodiments, other types of information may be used in determining models for claims, including social validation, trust coefficients of indirect connections, factors used in determining affinity scores, manual adjustments by agents, factors used in determining whether an agent is generating spam or malware on the social networking system 100, negative feedback received about claims, trusted connections having negative truth coefficients for an author or a claim, the total number of agents that trust a claim or an author, overwritten claims, and bad information listed in an assertion of a claim. For example, social validation, or interactions by other agents connected to the author on the social networking system 100, such as commenting on a content item, sharing a content item or node, "liking" a content item or node by clicking on a link to express approval, mentioning an agent or node in a content item, or tagging an agent or node in a content item, may be used as an input in determining a claim's truth coefficient because social validation adds legitimacy to a claim. Trust coefficients of indirect connections to a viewing agent, such as a trust coefficient for an entity liked by a trusted friend of the viewing agent, may also be used in determining a trust coefficient, or claim truth coefficient, for a claim authored by the entity using the trust coefficient for the entity from the perspective of the trusted friend of the viewing agent. This implied trust coefficient may be useful because of the trust relationship between the friend and the viewing agent, which may be a trust coefficient having a minimum trust coefficient. The total number of agents that trust a claim or an author may also have significance in determining a trust coefficient for a claim or a trust coefficient for an author.

Other factors that may be used in determining models for claims include negative feedback received about claims, identifying trusted connections having negative truth coefficients for an author or a claim, claims by a first agent overwritten by a second agent, and bad information listed in an assertion of a claim. For example, negative feedback may include an agent clicking on a link to "X" out the claim, providing feedback that the claim is unwanted, uninteresting, sexually explicit, against the agent's views, offensive, misleading, untrue, repetitive, or feedback manually inputted by the agent. In another embodiment, the social networking system 100 may have generated negative trust coefficients for authors and claims for trusted connections of a viewing agent. Trusted connections of a viewing agent may have trust coefficients higher than a predetermined threshold. As a result, the negative trust coefficients for authors and claims generated for trusted connections of a viewing agent may be used in determining trust coefficients for the viewing agent.

In a further embodiment, the fact that a claim has been overwritten, meaning that a new claim with a new assertion has replaced the overwritten claim, may also be used in determining a model for claims. In yet another embodiment, an agent may report to the social networking system 100 that a claim includes bad information by attempting to use the information included in the claim. For example, a viewing agent may view a claim that an agent's phone number is 867-5309 and attempt to establish a phone call to that phone number. In calling the phone number, the viewing agent may be informed that the phone number is a bad number, or that the phone number does not exist. As a result, the social networking system 100 may use that information to determine the claim truth coefficient of the claim that includes the bad information.

In one embodiment, a social networking system 100 uses a machine learning algorithm to analyze user feedback to retrain one or more models for determining truth coefficients. Other uses of machine learning include selecting inputs in models to determine truth coefficients of claims, determining predetermined thresholds for prompting a viewing agent for feedback regarding a claim, and generating truth coefficients for an assertion based on derivative claims and user feedback regarding claims that include the assertion.

Conflicting Claims

Because of the subjective nature of claims, claims about a particular subject may be conflicting. The existence of conflicting claims may indicate that one of the claims may be false or that there are multiple claims that may all be truthful for a particular subject. Returning to FIG. 1C, in which multiple authors have generated multiple, conflicting claims about a particular subject, the social networking system may also evaluate the truthfulness of the claims. As a result of the viewing agent (agent A 166) being included in the audiences 176, 178, and 180 for the claims 160, 162, and 164 made about the subject 158 of where the first author 152 currently lives, the social networking system 100 may evaluate the truthfulness of all the claims 160, 162, and 164 made about the subject 158 in light of the connections of the viewing agent (agent A 166). A different truth coefficient may be determined by the claim evaluation module 226 for each of the claims 160, 162, and 164. Using the determined truth coefficients, the social networking system 100 may then provide the most appropriate claim for the subject 158 to the viewing agent (agent A 166). In one embodiment, the claims 160, 162, and 164 are presented to the viewing agent in order of truth coefficient, from highest to lowest. In another embodiment, the claim with the highest truth coefficient is presented to the viewing agent.

In this example, the assertion of the claim of where the first author 152 current lives is correct or incorrect, true or false. The social networking system 100, recognizing the inconsistency, may prompt the third author 156 (agent A 166) to ask where the first author 152 currently lives, either Pacifica (from claim 164), Daly City (from claim 162), or San Francisco (from claim 160). The first author 152 may respond that he lives in Daly City, indicating that the second author 154 correctly claimed where the first author 152 currently lives. Alternatively, agent A 166 (the third author 156) may recognize that the second author 154 may be more correct because of a recent move and, as a result, copy the claim 162 to the claim 164 about the subject 158 of where the first author 152 currently lives. In another embodiment, the social networking system 100 may recommend to the third author 156 (agent A 166) to adopt the claim 162 made by the second author 154 based on the reciprocated claim that the relationship status between the second author 154 and the first author 152 is married.

In one embodiment, a social networking system 100 may measure, as a factor of determining an agent's reputation score, how often the agent generates false claims. False claims may be determined by prompting an agent to verify a claim made about the agent, evaluating claims made by agents about a subject in aggregate to determine which agents generated a conflicting claim that may be judged to be untrue when compared to the majority of claims, and machine learning techniques used to determine agents making false claims based on other agents known to make true claims. False claims may have negative truth coefficients, in one embodiment.

As an example, a first user that tags a second user in a photo on the social networking system 100 is claiming that the second user appears in the photo. In reality, the second user may not appear in the photo and the first user may be intentionally making a false claim to make a joke about the second user. For example, a first user may claim, as a joke, that a second user appears in a photograph of Jabba the Hut from Star Wars, tagging the second user in the picture on the social networking system 100. The second user may be fine with the joke and may confirm the tagging by the first user. In this example, the first user and the second user have both made claims that the second user appears in the picture of Jabba the Hut. However, other viewing agents may respond to a prompt from the social networking system 100 that the tag of the second user is a false claim.

Other mechanisms, such as image recognition techniques, may be used to identify faces in photos, thereby recognizing the photo of Jabba the Hut is not a picture of the second user. As a result, the claim evaluation module 226 may adapt the model determining truth coefficients for photo tags by the first and second users to take into account that the first and second users tend to corroborate each other's false claims. Using the user feedback, machine learning methods may be used to identify patterns of users' false claims on the social networking system 100. Based on an analysis of hundreds of thousands of photos, the claim evaluation module 226 may determine that some agents are more prone to make false claims about tagging photos of other agents. The claim evaluation module 226 may identify these users that have a tendency to make false claims on the social networking system 100 for certain types of claims.

Negative truth coefficients may be assigned to claims that are not chosen or selected among conflicting claims presented to a viewing agent. For example, a second claim made by a second authoring agent about a subject agent that conflicts with a first claim made by a first authoring agent may be chosen by the subject agent to be presented to an audience, such as all agents of the social networking system 100. Because the second claim was chosen by the subject agent to be presented to an audience, it may be assumed that the second claim is more truthful than the first claim, in one embodiment. As a result, the model used in determining a truth coefficient for the first claim and the second claim may take into account that the second claim conflicting with the first claim was selected by the subject agent. The first claim may be assigned a negative truth coefficient, in one embodiment. To give this example a context within the social networking system 100, the first claim may be that the subject agent, a business entity having a place of business at an address in the real-world, is located at 123 Main Street. The second claim may be that the subject agent is located at 456 Market Street, San Francisco, Calif. If the second claim was chosen over the first claim by the subject agent, then the truth coefficient for the first claim would be lower than the truth coefficient for second claim, in one embodiment. In another embodiment, if a third-party application, such as a business listings application, verifies that the subject agent is located at 456 Market Street, San Francisco, Calif., then the truth coefficient for the first claim may be set to 0. A negative truth coefficient may be assigned, in another embodiment, based on whether the claim has been purposefully made to be incorrect.

Heuristics analysis, or gathering and analyzing different types of information, may be used to identify false claims. For example, check-in events may be falsely created by some users of the social networking system 100, such as checking in other users at a location when those users are actually not physically present in that location. An author may check himself and two other users in at the Golden Gate Bridge in San Francisco, Calif., even if the two other users are not actually present at the Golden Gate Bridge. The other two users may have just recently checked-in over 2000 miles away in New York City at the Statue of Liberty. The claim evaluation module 226 may analyze this information based on the GPS location technology of the users claiming they are in New York City, and determine that the author of the check-in event at the Golden Gate Bridge has made a false claim about the other two users being present with him using heuristics analysis techniques.

Evaluating a Single Claim on a Social Networking System

Figure 3:
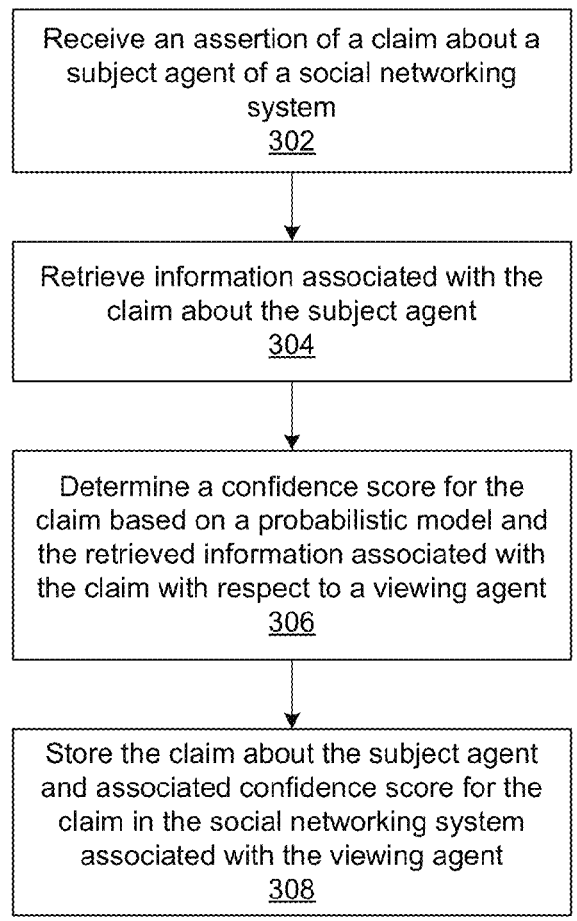
FIG. 3 is a flowchart of a process of evaluating a claim in a social networking system, in accordance with an embodiment of the invention.

Having described various methods of determining truth coefficients for claims and authors in a social networking system 100, the following figures illustrate various embodiments of evaluating claims using one or more of the methods described above. FIG. 3 illustrates a flow chart diagram depicting a process of evaluating a claim in a social networking system. Throughout the description of these figures, example use cases are also described to further illustrate how claims may be evaluated in the social networking system 100 by determining truth coefficients from the vantage point of viewing agents.

As illustrated in FIG. 3, an assertion of a claim about a subject agent is received 302 by the social networking system 100. This assertion may be made by an authoring user of the social networking system 100, in one embodiment. In another embodiment, the assertion may be made by an authoring application or page representing an entity on the social networking system 100. In yet another embodiment, the assertion may be made by an external system or external website communicating with the social networking system 100. The assertion of the claim may comprise an action performed by a user on the social networking system 100, such as a user checking into a place using a mobile device that has GPS location awareness functionality, a user tagging another user in a photo that has been uploaded to the social networking system 100, a user calendaring an event on the social networking system 100 and inviting other users to the event, a user declaring biographical information on a user profile about himself or herself, a user listing contact information for another user on the social networking system, a user confirming a tag of another user in a photo or video on the social networking system, an application communicating to the social networking system 100 that a user ordered an item on a menu using the application using a custom graph action and a custom graph object, and the like.

After an assertion of a claim about a subject agent is received 302, information associated with the claim about the subject agent is retrieved 304. This information may include other information about the subject agent that may help corroborate the claim being made, such as location information from other check-in events made by the subject agent, information retrieved from user profiles of other users connected to the subject agent, activity recorded in an action log on the social networking system 100, information related to the claim retrieved from edge objects associated with the subject agent, information retrieved from external websites related to the claim, and other information received from third-party providers related to the claim. For example, a user may claim that another user is with him at the Eiffel Tower in Paris, France in a check-in event on the social networking system 100. The audience of this claim may be selected users that are connected to the user, all users connected to the user, or the claim may be made publicly available and searchable. In truth, the other user, the subject user of the claim, may actually be located in New York City, having just checked-in at the Statue of Liberty. That check-in event in New York City may have a different audience, such as users connected to the subject user. Information about the subject user, including his recent check-in at the Statue of Liberty and the audiences selected for the checkins, may be retrieved 304 after the claim that the subject user is located at the Eiffel Tower is received 302.

After the information associated with the claim about the subject agent is retrieved 304, a truth coefficient is determined 306 for the claim based on a probabilistic model and the retrieved information associated with the claim. An administrator may, in one embodiment, manually determine factors in a claim model, such as determining weights for different factors using the claim evaluation module 194. The claim evaluation module 194 may select factors in a claim model, in another embodiment, based on the results of regression analysis and user feedback regarding prior claim objects. Returning to the example above, the conflict between the two check-in events for the same user, the first being at the Eiffel Tower in Paris and the second being at the Statue of Liberty, may be assigned weights in the claim model that evaluates the claim based on the perspective of a viewing agent in the audience selected for the claim. The claim truth coefficient for a viewing agent that has a proclivity to believe claims made by the author for the claim that the subject user is at the Eiffel Tower may be higher than the claim truth coefficient for another viewing agent that does not have the same proclivity. In this way, the social networking system 100 may determine 306 different truth coefficients based on the viewing agents' affinities for other users, as well as proclivities to believe the asserting user's claims.

After a truth coefficient has been determined 306 for the claim with respect to a viewing agent, the claim and associated truth coefficient are stored 308 in the social networking system associated with the viewing agent. The claim and associated truth coefficient may be stored 508 in the social networking system 100 as a claim object 116 in the claim store 220. In one embodiment, a claim object 116 is automatically generated when a claim is received 302 by the social networking system 100. The determined truth coefficient for the claim is stored in the previously generated claim object 116 associated with the claim. For example, a user filling out his or her own user profile may declare biographical information, including the user's age, gender, current city, hometown, colleges or universities attended, employment history, and the like. As the user fills out the user profile object, an assertion of a claim about the user is received 302. A claim object 116 may be automatically generated for the claim and pre-populated with an initial claim truth coefficient. Once information about the claim is retrieved 304, a truth coefficient may be determined 306 for the claim object 116. In another embodiment, a truth coefficient may be determined 306 for the claim object 116 based on a viewing agent requesting the claim. In that embodiment, the truth coefficient is based on the viewing agent's affinity scores for the agent and other objects in the social networking system 100, such as the viewing agent's proclivities for the authoring agent's reputation for truthfulness. If the viewing agent is inclined to accept false claims made by the authoring agent, then the proclivity of the viewing agent may be taken into account while determining the truth coefficient of the claim for the viewing agent. A claim object 116 for the claim made in the social networking system 100 may include a plurality of truth coefficients associated with a plurality of viewing agents. As a result, the social networking system 100 may account for a viewing agent's social relationships with other users on the social networking system 100 when determining the claim truth coefficients of claims made on the social networking system 100.

Custom graph actions and custom graph objects may also be evaluated by the social networking system 100 as claim objects. For example, a page representing Mission Chinese Restaurant may make a claim that a user of the social networking system 100 ordered Szechuan Chicken, using a custom graph action of "order" and a custom graph object of "Szechuan Chicken." The page, an entity on the social networking system 100, may have a sophisticated ordering system that enables a credit card transaction associated with the user to be communicated to the social networking system 100, for example. The page for Mission Chinese Restaurant may be connected to an external website 218 that enables users of the social networking system 100 to be connected to the external website 218 to facilitate communication of what the users ordered through the external website 218. The claim made by the page may be evaluated by the claim evaluation module 226 to have a high truth coefficient because of the technology underlying the information included in the claim.

Evaluating Multiple Claims on a Social Networking System

Figure 4:
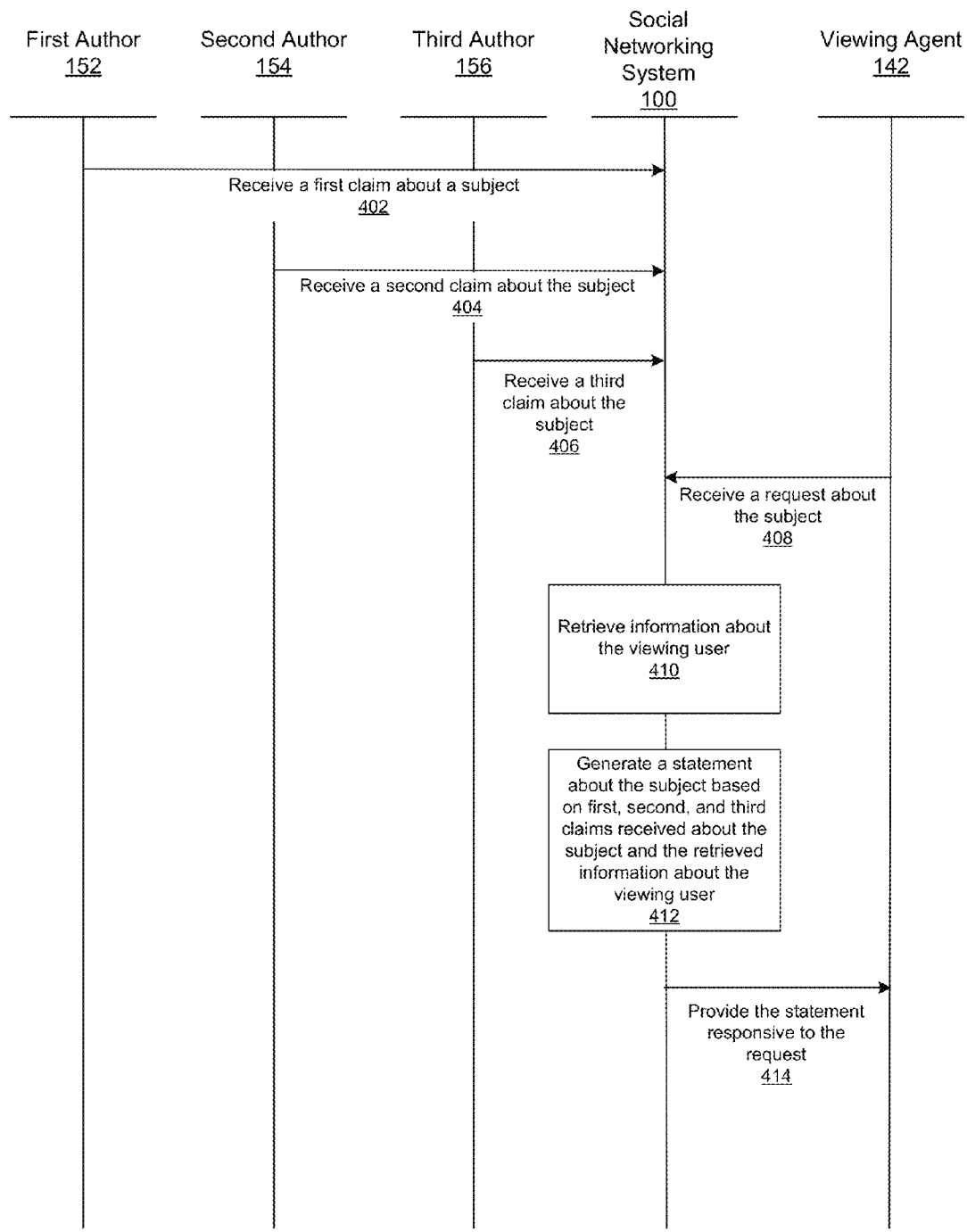
FIG. 4 is an interaction diagram illustrating a process of evaluating multiple claims about the same subject in a social networking system, in accordance with an embodiment of the invention.
Figure 5:
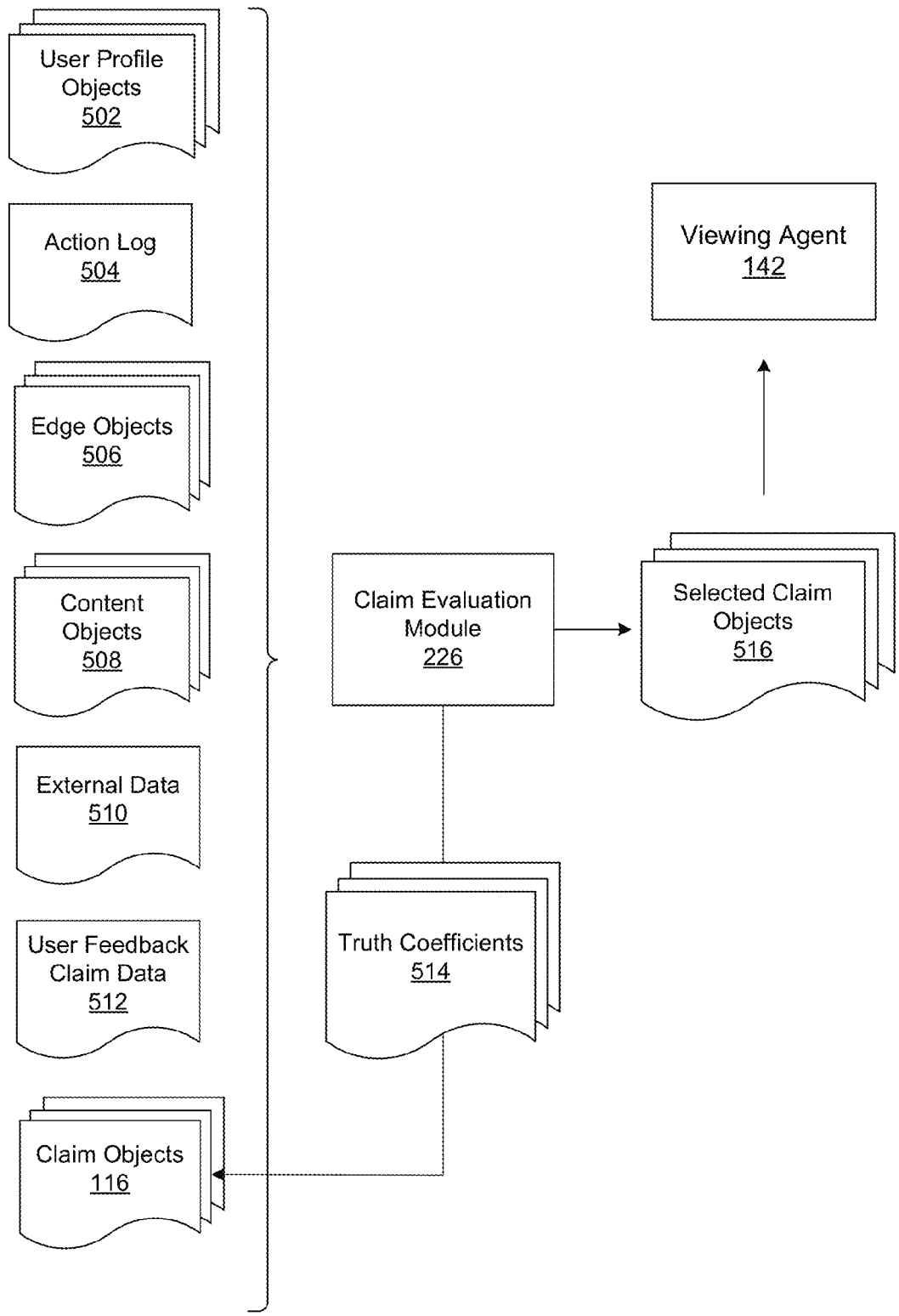
FIG. 5 is a high level block diagram illustrating a process of evaluating claims in a social networking system, in accordance with an embodiment of the invention.

FIG. 4 illustrates an interaction diagram of a process for evaluating claims to provide information based on the evaluated claims to a viewing agent of the social networking system 100. FIG. 5 illustrates a high level block diagram depicting sources for information used in evaluating claims in a social networking system. As illustrated in FIG. 4, several authors may make different claims about a subject to different audiences. The social networking system 100 receiving these claims may provide a statement about the subject involved in the claims based on the received claims and using information retrieved about the viewing agent. The statement may be a "best" claim for the viewing agent 142, in one embodiment. The statement may also include all claims that have assertions that include the subject that are viewable by the viewing agent 142, in another embodiment. The claims may be ranked by truth coefficient, in a further embodiment. In this way, evaluated claims may be provided to users of a social networking system 100.

A first claim about a subject is received 402 by the social networking system 100 from a first author 152. This claim may be received 402 by the social networking system 100 through various user interfaces with the first author 152, such as a user selecting a birth date on his or her own profile, a user entering information to be declared on his or her profile, a user making a claim that another user is a good cook through a claim generating user interface provided by a claim generation module 216, and so on. Similarly, a second claim about a subject is received 404 by the social networking system 100 from a second author 154 and a third claim about a subject is received 406 by the social networking system 100 from a third author 156.

A request about the subject may be received 408 from a viewing agent 142 by the social networking system 100. The request about the subject may be received 408 from the viewing agent 142 through a request for a web page including the subject, such as a user's profile information, a page showing all claims made about a user including the subject, and an application that provides all claims made about the subject. In one embodiment, the viewing agent 142 may be unconnected to a user and request contact information about the user. In that embodiment, the request for contact information is a request received 408 by the social networking system 100 about the contact information, the subject of one or more claims made by users of the social networking system 100.

The social networking system 100 may retrieve 410 information about the viewing agent in response to receiving 408 the request about the subject. The information retrieved 410 by the social networking system 100 may include social information about the viewing agent 142 on the social networking system 100, such as connections to other users, entities, and concepts on the social networking system 100 retrieved from user profile objects, an action log, edge objects, and content objects in the social networking system 100. Other information that may be retrieved 410 includes truthfulness reputation scores and affinity scores for users and entities making claims about the subject that are connected to the viewing agent 142 and secondary connections of the viewing agent 142.

Based on the retrieved information about the viewing agent and the first, second, and third claims received about the subject, a statement may be generated 412 about the subject by the social networking system 100. The statement may comprise a recitation of the first, second, and third claims, in one embodiment, provided that the viewing agent 142 is included within the audiences for the first, second, and third claims. In another embodiment, the statement may include a "best" claim from among the first, second, and third claims based on the retrieved information about the viewing agent. For example, a viewing agent may be provided with the best phone number for a particular user of the social networking system 100 from among three claims with different phone numbers by different authors. Information about the viewing agent 142, such as whether the viewing agent is connected to authors, reputation scores of those authors, and affinity scores for the authors, may be used in selecting the best phone number for the particular user, taking into account social information about the viewing agent 142. The best phone number for the particular user may then be generated 412 in a statement in the social networking system 100.

In one embodiment, the generated 412 statement may be stored in the social networking system 100. In a further embodiment, the best claim from among the first, second, and third claims may be determined by combining truth coefficient values for the first, second, and third claims. For example, if the first and second claim about a phone number for the particular user have truth coefficient values of 0.5 and 0.6 and recite the same phone number, 867-5309, then the social networking system 100 may combine these truth coefficient values to provide a truth coefficient value for the assertion that the particular user's phone number is 867-5309. If the third claim about the phone number for the particular user has a truth coefficient value of −0.5 and the assertion of the phone number for the third claim is the same, 867-5309, then the total truth coefficient value for the assertion that the phone number of the particular user is 867-5309 is 0.6. If the third claim has a different assertion of the phone number, such as 123-4567, then the truth coefficient value for the third claim would not be added to the truth coefficient values of the first and second claims. In that case, the assertion that the particular user's phone number is 867-5309 may be associated with a truth coefficient of 1.1 (adding the truth coefficient of the first and second claims), while the assertion that the particular user's phone number is 123-4567 may be associated with a truth coefficient of −0.5 (the truth coefficient of the third claim). In generating 412 a statement about the subject, the truth coefficients for the assertions, based on the claims about the subject, may be compared. In this case, the generated 312 statement may include the "best" claim based on the combined truth coefficient, that the particular user's phone number is 867-5309. This statement would then be provided 414 for display in a user interface or other application on the social networking system 100 to the viewing agent 142 responsive to the request.

Using Different Sources of Information in Evaluating Claims in a Social Networking System In evaluating claims, a social networking system 100 is not limited to a viewing agent's social information, such as affinity scores, and truth coefficients for authors and claims to determine truth coefficients for claim. A social networking system 100 may access multiple sources of information, including related claims generated by agents that may or may not be connected to the viewing agent. Additionally, heuristics analysis may be used in analyzing the different types of claims and models for determining truth coefficients.

A claim evaluation module 226 interfaces with various modules on a social networking system 100 as well as external websites 218 to process information about claim objects 116 of the social networking system 100. Using identifying information about the author agent of a claim, user profile objects, entries in an action log, edge objects, and content objects may be retrieved by the claim evaluation module 226 to extract information related to an assertion made in a claim object 116. A claim evaluation module 226 may also retrieve external data 190 that may include content on a third-party website and other data licensed from third-party providers. In one embodiment, the information retrieved from external websites 218 may be processed in an asynchronous batch process separate from the claim evaluation module 226.

As illustrated in FIG. 5, the social networking system 100 includes various sources of information that may be used in generating claim objects and evaluating assertions in the generated claim objects made on the social networking system 100 in one embodiment, including user profile objects 502 that represent users of the social networking system 100, an action log 504 that records actions performed on the social networking system 100, edge objects 506 that represent edges interconnecting nodes of the social networking system 100, content objects 508 that represent content added to the social networking system 100 by users and entities, external data 510 that may be retrieved on websites and systems external to the social networking system 100, and user feedback claim data 512 that may be gathered by a social networking system 100 requesting user feedback about claims.

User profile objects 502 include declarative information about the user that was explicitly shared by the user and expressed in an action on objects in the social networking system 100. In one embodiment, a user profile object 502 may include thirty or more different data fields, each data field describing an attribute of the corresponding user of the social networking system 100. A claim object 116 may be generated for every piece of declarative information included in a user profile object 502, such as a user's age, gender, hometown, location, educational history, employment history, and interests. A claim evaluation module 226 may generate a claim object 116 for a particular claim, such as a user claiming to have graduated from Harvard by declaring the assertion on the user's profile. However, an agent representing Harvard may make a conflicting claim that the user did not graduate with a degree from Harvard, but instead completed a summer seminar course at Harvard. As a result, the claim evaluation module 226 is provided with an additional source of information in evaluating the truthfulness of the particular claim.

An action log 504 and edge objects 506 are two additional sources of information that may be relied upon by the claim evaluation module 226 in gathering information related to a claim for determining a truth coefficient for the claim. An action log 504 records user interactions with various objects on the social networking system 100 as well as custom graph actions performed on graph objects on external systems. Edge objects 506 may represent interactions that occur between objects on the social networking system 100, such as messaging between users, a user's expression of interest in a content item posted by another user or an entity on the social networking system such as a page, a user commenting on a content item posted by another user, and the like. User interactions may be used by a claim evaluation module 226 in determining a claim truth coefficient for a claim made by a user, in one embodiment. For example, if a user claims to have graduated from Harvard as declared through the user's profile, user interactions such as having connections on the social networking system to other users who also claim that the user graduated from Harvard may be used by the claim evaluation module 226 in determining a truth coefficient for that claim. Other user activity and interactions may be gathered and analyzed by the claim evaluation module 226, such as membership in groups including the keyword "Harvard," attendance at events including the keywords "Harvard," and "Ivy League," and interactions with pages on the social networking system relating to Harvard.

Content objects 508, such as status messages, messages between users, page posts, photos, videos, notes, events, check-in events, and the like, may be used in evaluating assertions made in claims by users of the social networking system 100. External data 510 gathered from websites external to the social networking system 100, such as an external system for tracking alumni of colleges, may be used by a claim evaluation module 226 in determining a truth coefficient for the claim. For example, attendance at an event for Harvard alumni by the user claiming to have graduated from Harvard may be retrieved from a content object 508 for the event or from external data 510 gathered from the external system for tracking alumni of Harvard. This type of information may positively influence a truth coefficient for the claim as determined by the claim evaluation module 226.

User feedback claim data 512 may be gathered by a social networking system 100 in order to validate one or more claims made by a user of the social networking system 100. For example, the social networking system 100 may provide a user interface that enables users to respond to questions posed by the social networking system 100, such as whether the viewing agent was a classmate with a user at Harvard, whether the viewing agent was roommates with the user while at Harvard, and whether the user graduated from Harvard. This user feedback claim data 512 may be used by the claim evaluation module 226 to influence a truth coefficient of the claim.

Claim objects 116 may be generated by the social networking system 100 through existing user interfaces, such as a text input interface used to tag a user in a photo, video, check-in event, or another content object 508 on the social networking system 100, another user interface used to declare profile information about users, as well as other user interfaces that may be used by users to generate claims about other users. In one embodiment, claim objects 116 may be generated from existing user profile objects 502, edge objects 506, content objects 508, and external data 510 such as custom graph actions and custom graph objects.

A claim evaluation module 226 may retrieve information from various sources on the social networking system 100 to evaluate claims having assertions made about a subject based on social information of the viewing agent 142 of the claims. The claim evaluation module 226 may use one or more methods of computing a truth coefficient 514. In one embodiment, a truth coefficient 514 may be determined for an author of a claim about the subject for a particular viewing agent 142 of the social networking system 100 based on a history of past interactions between the viewing agent 142 and the author of the claim. Selected claim objects 516 may be provided by the claim evaluation module 226 to a viewing agent 142 based on the accessibility of the claim objects 116 with respect to viewing agent 142, in one embodiment. In another embodiment, selected claim objects 516 may be provided by the claim evaluation module 226 to a viewing agent 142 in a ranking based on the determined truth coefficients 514 of the selected claim objects 516.

As an example, the claim evaluation module 226 may retrieve all claim objects 116 associated with the subject of a user's age to determine truth coefficients 514 for the claim objects 116. The user may claim that she is 29 while her friends may make claims that the user 30. Other information about the user may be retrieved from various sources on the social networking system 100 to help determine the truth coefficients 514, such as actions performed by users on the social networking system 100. Using a prediction model having several factors, the claim evaluation module 226 may determine truth coefficients 514 for the claim objects 116 associated with the subject of her age, assigning one truth coefficient 514 to her claim that she is 29 and a different truth coefficient 514 to her friends' claim that she is 30 years old based on a viewing agent's affinity scores for the user and the user's friends.

Truth coefficients 514 may be stored as metadata in claim objects 116 for each viewing agent 142. The affinity score of the viewing agent 142 for the user may affect the truth coefficients 514 determined by the claim evaluation module 226 depending on whether the model(s) for determining the truth coefficients 514 include factors also used in determining affinity scores. Separately, a viewing agent 142 that has a close affinity for a user may be more inclined to believe claims made by that user. A viewing agent 142 that has no connection to a user's friends, on the other hand, has no reason to trust the user's friends' claims about the user. As a result, truth coefficients 514 for claim objects 116 about the user's age may be highly influenced by the viewing agent's connection to the user, or affinity score for the user, as well as the lack of connections to the user's friends, in one embodiment. In turn, the claim evaluation module 226 may assign a lower truth coefficient 514 to the user's friends' claims than the truth coefficient 514 for the user's claim.

In another embodiment, information retrieved from other objects on the social networking system 100 may be used by the claim evaluation module 226 to assign truth coefficients 514 to the claim objects 116. In that embodiment, the social networking system 100 may make a claim about a user's age based on the information publicly available to all users of the social networking system 100. In a further embodiment, the claim evaluation module 226 may provide all claims that are viewable by a viewing agent 142 by providing selected claim objects 516 based on the audiences for those selected claim objects 516. In yet another embodiment, the claim evaluation module 226 may provide a claim to a viewing agent 142 based on the highest truth coefficient for the claim based on the viewing agent's connections to authors making the claims.

In one embodiment, heuristics analysis may be used to gather information from the social networking system 100 that may be used to evaluate claims. For example, an author may make a claim that he lives in San Francisco, Calif., while an action log 504 may record various check-in events performed by users of the social networking system 100, including the author as well as the author's connections on the social networking system 100, such as other users, entities, events, groups, applications, and the like. Heuristics analysis may be used to analyze claims about a user's current city in which he or she lives, as declared on the social networking system 100, to determine how often the user is associated with a check-in event in or within 50 miles of San Francisco, Calif. This information may be used as a factor in evaluating the truthfulness of declared current city living situation claims in a model by the claim evaluation module 226, in one embodiment.

Another use of heuristics analysis includes gathering and analyzing different types of information about claim objects 116 being evaluated. For example, a page representing a Chinese restaurant may make a claim that a user ordered Szechuan chicken ten times in the past month. As mentioned earlier, custom graph actions and custom graph objects may be used by an external website or application to communicate user activities performed on the external website or application back to the social networking system 100. The claim evaluation module 226 may gather and analyze different types of claims related to this claim, such as the user claiming to like Chinese food, multiple users claiming that the user was present in a check-in event at the same Chinese restaurant represented by the page making the claim, pictures tagged with the custom graph object for "Szechuan chicken" along with a tag for the user uploaded to the social networking system 100, and so on. Other information, such as the reputation of the page and/or application making the claim, may also be gathered and analyzed by the claim evaluation module 226. Using the gathered information, heuristics analysis may be used to determine that the claim made by the page representing the Chinese restaurant is truthful. As a result, the claim evaluation module 226 may gather and analyze different types of information, including other claims, to evaluate the truthfulness of a particular claim made on the social networking system 100.

Example Applications Using Claims in a Social Networking System

A social networking system 100 may utilize claim objects 116 in several different ways to provide additional services internal and external to the social networking system 100. Such uses may include a contact card application provided by the social networking system 100 to enable agents to manage contact information about other agents on the social networking system 100, a customer relationship management system that enables agents to indicate relationships with other agents and identify expertise levels based on recommendations by the agents, a browse and/or query system that enables agents to query claims made by agents internal and external to the social networking system, alternative business models that enable agents to be compensated for making claims and/or providing access to their claims, and so forth. Each of these uses is further described in detail below.

Claim-Based Profiles on a Social Networking System

Figure 6A:
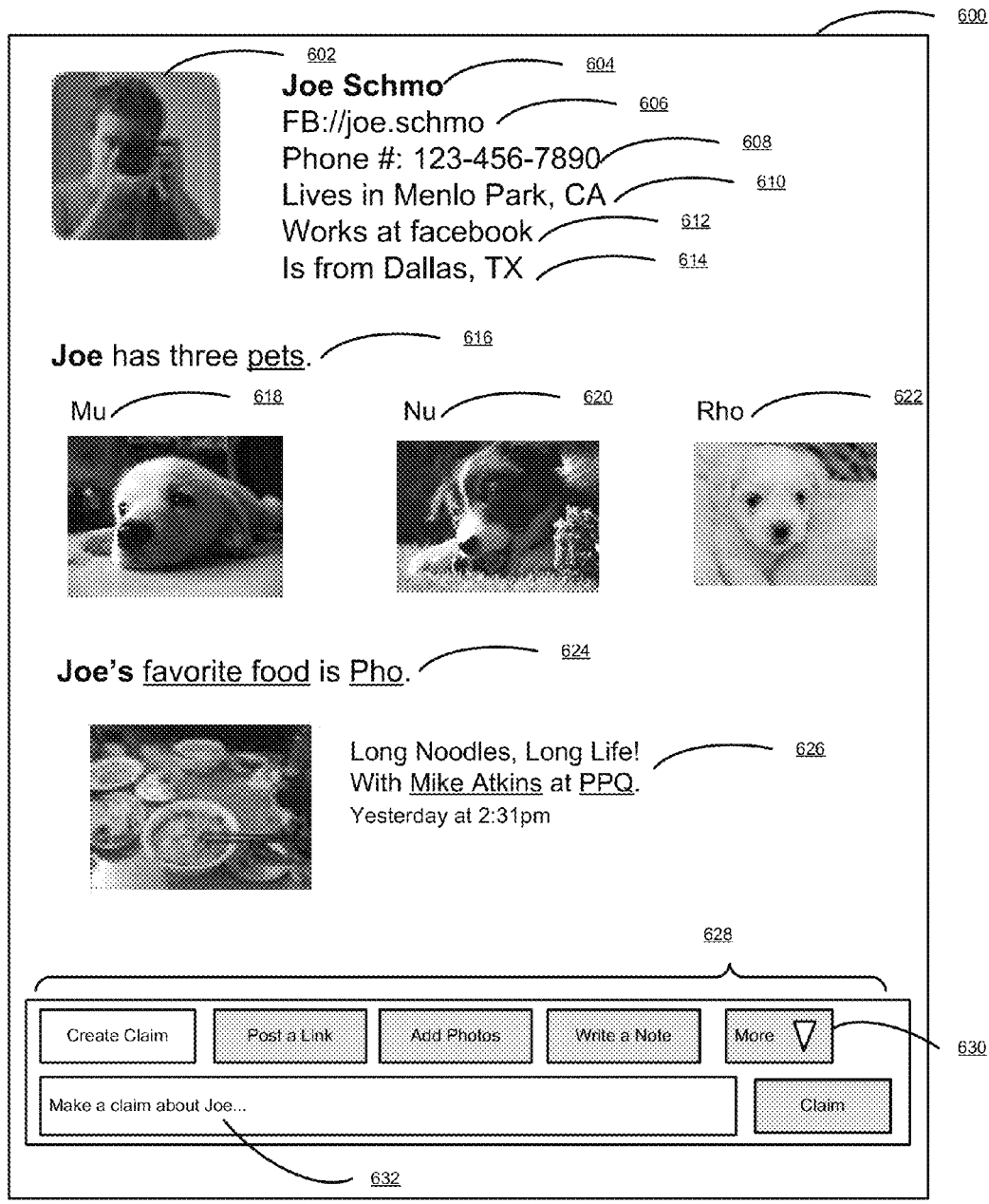
FIGS. 6A and 6B are examples of an application on a social networking system that provides information to viewers based on evaluated claims, in accordance with an embodiment of the invention.
Figure 6B:
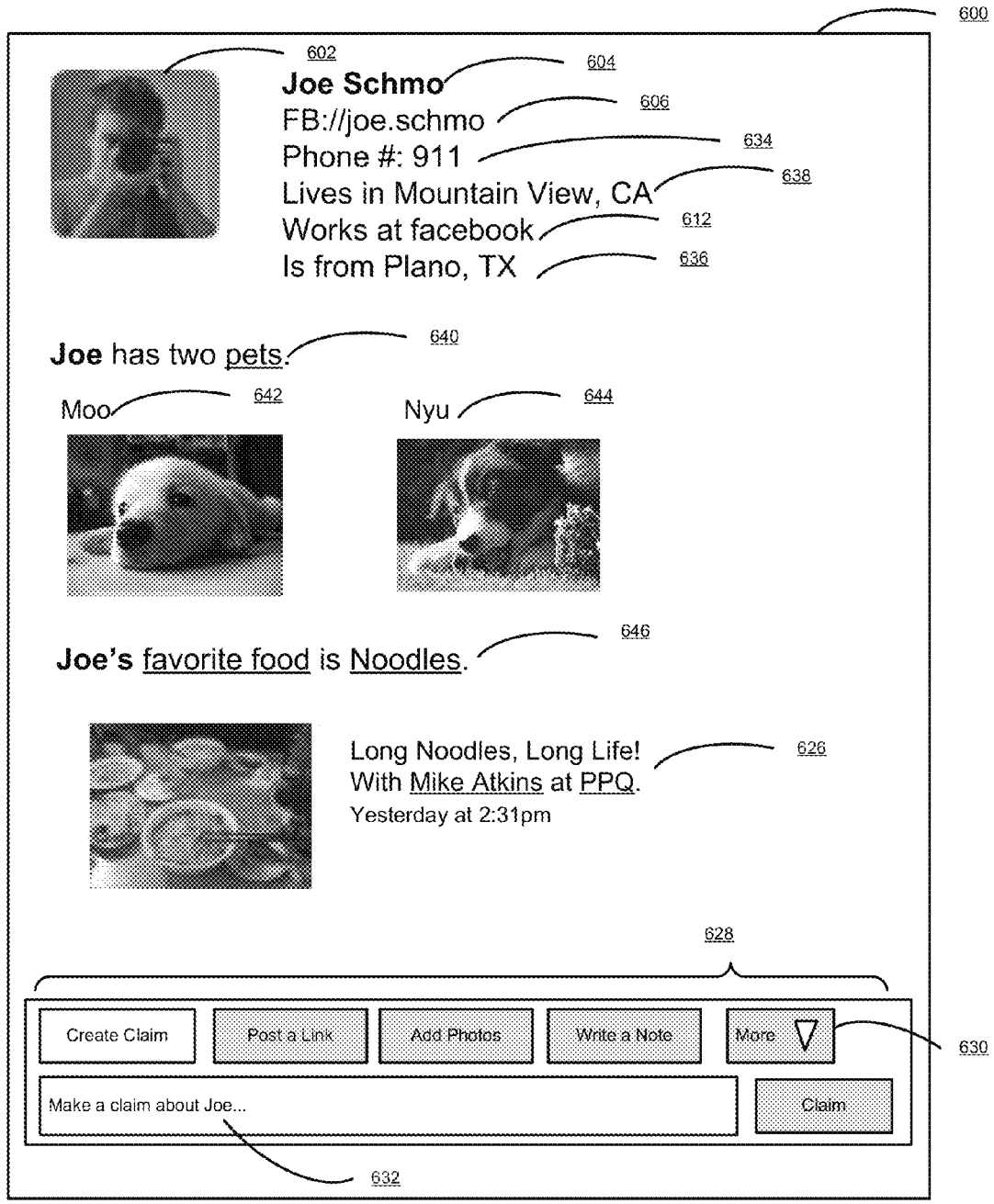

FIGS. 6A and 6B are example screenshots depicting a user interface for receiving and providing claims about users in a social networking system, in accordance with an embodiment of the invention. A social networking system 100 may utilize claim objects 116 in several different ways. In one embodiment, a contact card application may be provided by the social networking system 100 to enable users to manage contact information about other users on the social networking system 100. Instead of viewing a user profile that the subject user has generated himself or herself, the viewing agent may view claims made about the subject user with respect to information accessible by the viewing agent based on the audiences associated with the claims.

As illustrated in FIG. 6A, a contact card application user interface 600 includes a profile picture 602 of the subject user, a name 604 of the subject user, a persistent identifier 606 of the subject user, such as a URL, a phone number 608 for the subject user, a current city 610 of the subject user, a current employer 612 of the subject user, and a hometown 614 of the subject user. Here, Joe Schmo is the subject user. In FIG. 6A, each of the biographical information items are associated with claim objects 116 stored in a claim store 220. Also provided by the contact card application user interface 600 is a claim 616 that Joe has three pets, a claim 618 that the first pet is Mu who appears in a photo, a claim 620 that the second pet is Nu, and a claim 622 that the third pet is Rho. The contact card application user interface 600 also includes a claim 624 that Joe's favorite food is Pho and a recent check-in event 626 related to this favorite food claim 624. The claims listed in the contact card application user interface 600 are configured with audiences that the viewing agent is included in. One or more of the claims listed in the contact card application user interface 600 may be a claim authored by the viewing agent, such as the favorite food claim 624. Users of the social networking system 100 may make claims about other users through a claim composer interface 628. Here, the claim composer interface 628 includes various tabs to create claims, post a link related to a claim, add photos related to a claim, and write a note about the claim. A text field 632 is provided within the claim composer interface 628 for receiving user input for the claim. A drop down menu 630 may provide more options for creating a claim, such as uploading a video related to a claim, requesting information from other users about a claim (such as verifying the assertion made in the claim), sending a request to authors of claims for access to claims, approving received requests for access to claims, delegating approval of access to selected users to provide access to information included in the contact card application user interface 600, and selecting the audience to be associated with the claim.

FIG. 6A includes claims having various claim types. For example, the claim 616 that "Joe has three pets" is a biographical claim type about pet ownership. In one embodiment, the social networking system 100 may identify keywords in a claim, such as "pets," to identify the claim type of the claim being made on the social networking system 100. As another example, the claim 624 that "Joe's favorite food is Pho" is a favorite food claim type specifying a type of food that may be represented as a custom graph object in the social networking system 100. In one embodiment, the social networking system 100 may make a claim about a user, such as the user's favorite food, based on content items uploaded to the social networking system 100. In another embodiment, the social networking system 100 may suggest to a user a claim based on other claims made by other users about the same subject, such as the user's favorite food. In yet another embodiment, custom graph objects, such as Pho, may be associated with other graph objects, such as noodles, that may help the social networking system 100 retrieve related content posts, such as the check-in event 626 that includes the text "Long Noodles, Long Life!" and a user tag of "Mike Atkins" at a location named "PPQ." PPQ may be represented by a page on the social networking system 100 that serves Pho as well as other noodles. Because of the association with the custom graph object of "Pho" and attributes of the page object for "PPQ," the check-in event 626 may be displayed in the contact card application user interface 600. In one embodiment, the user tag of "Mike Atkins" may also be a claim. Thus, the claim that "Joe's favorite food is Pho" may rely on another claim that "Mike Atkins" was with "Joe Schmo" at "PPQ," as illustrated by the check-in event claim 626.

Different claims may be presented to a viewing agent based on whether the viewing agent is included in the audience for a claim. For example, a first viewing agent may be provided with the contact card application user interface 600 illustrated in FIG. 6A, in which the hometown claim 614 lists "Dallas, Tex." as the hometown of Joe Schmo. A second viewing agent may be provided with the contact card application user interface 600 illustrated in FIG. 6B, in which the hometown claim 636 lists "Plano, Tex." as the hometown of Joe Schmo. The subject user, Joe Schmo, may have listed "Dallas, Tex." in his user profile as his hometown, creating the claim 614 that he is from Dallas. However, other users connected to the subject user may have claimed that Joe Schmo is actually from Plano, a suburb of Dallas. The second viewing agent may be connected to the other users making the hometown claim 636 about Joe, such that the second viewing agent is included in the audience of the hometown claim 636. Different types of information may be gathered and analyzed to determine the best claim for the second viewing agent, such as check-in events near or in Dallas, Tex. (giving additional weight to check-in events during the holidays), a high number of user connections that list Plano, Tex. as their hometown, the number of user connections that list Dallas, Tex. as their hometown, interactions on the social networking system that indicate an interest in Dallas versus Plano (such as posting links about the city, supporting political candidates from the city, and joining groups of users with hometowns in the city), and examining other claims associated with the user (such as claims about attending a high school in the city, user connections that have claimed attending a high school in the city, etc.). As a result, the social networking system 100 may determine that the hometown claim 636 is the best claim for the second viewing agent using the claim model in the claim evaluation module 194 and provide that hometown claim 636 to the second viewing agent.

As illustrated in FIG. 6B, a second viewing agent may view different claims than a first viewing agent viewing the contact card application user interface 600 illustrated in FIG. 6A. The contact card application user interface 600 illustrated in FIG. 6B provides a different phone number for Joe Schmo, indicated by the phone number claim 634. The current city claim 638 also indicates that Joe Schmo lives in Mountain View, Calif. The pet owner claim 640 indicates that Joe has two pets: a first pet claim 642 that the first pet is Moo and a second pet claim 644 that the second pet is Nyu. The second viewing agent is also presented with a different custom graph object for the favorite food claim 646, listing "Noodles" as Joe's favorite food. The differences between the claims provided in FIG. 6A and the claims provided in FIG. 6B take into account social information retrieved about the subject user as well as information retrieved about the first and second viewing agents. For example, a second viewing agent may not be in the audience for the third pet claim 622 of the third pet named "Rho" and, as a result, may not be able to view that claim. The subject user may have only declared that he has two pets, forgetting to update his user profile after he got his third pet. Other users may have corrected the pet owner claim 640 to correctly claim that he has three pets, as provided in the first pet owner claim 616.

As mentioned above, other functionality may be incorporated into the claim composer interface 628. For example, a user may request contact information of a subject user, such as a phone number, that the user does not have access to based on not being included in the audience for the claim type that includes the subject user's phone number. In response to the request, the subject user may, without creating a connection to the requesting user, approve the request and expand the audience of the phone number claim type to include the requesting user. In another embodiment, the subject user may delegate the power to expand the audience of the phone number claim type to one or more selected users of the social networking system 100. In a further embodiment, a requesting user may make a request for the contact information, such as physical mailing addresses, in bulk by naming users of the social networking system, regardless of whether those users are connected to the requesting user. For example, the requesting user may be the maid of honor to users that are getting married and may need to get the physical mailing addresses of the engaged users' guest list for sending wedding invitations. In response to receiving a request for a physical mailing address, the subject user may or may not be connected to the maid of honor making the request. Another user connected to the subject user may be selected as a delegate to provide the requested information by making a claim about the physical mailing address of the subject user, or to provide access to the requested information by modifying the audience of the claim to include the requesting user.

The contact card application user interface 600 may comprise an application operating on the social networking system 100, in one embodiment. For example, the contact card application user interface 600 may be provided on a web browser operating on a user device connected to the social networking system 100 or the contact card application user interface 600 may be provided on a native application operating on a mobile device communicating with the social networking system 100 through a series of application programming interface (API) calls. In another embodiment, the contact card application user interface 600 may be a stand-alone application operating on an external system outside the social networking system 100. In the stand-alone application embodiment, the application may interface with several contact applications, external systems, and social networking systems to synchronize the contact information of users. In a further embodiment, the contact card application user interface 600 may operate on a mobile device and be integrated with the mobile device's operating system and contact management software.

Additional Uses of Claims in a Social Networking System

Aside from the contact card application user interface 600 illustrated in FIGS. 6A and 6B, the social networking system 100 may use claim objects 116 in various ways to provide information about users of the social networking system. For example, a lightweight customer relationship management (CRM) system may be provided by the social networking system 100 by enabling users to compose notes about other users on the social networking system 100. In one embodiment, a user trying to promote a product or sell a service may make notes about certain users that have interacted with the product or service, such as "contacted this user and the user agreed to forward the link to his friends." Claims may also be used to affect agent reputation in work experiences. For example, a user may note that he had a good experience working with another user and claim that the subject user is a "hard worker." Claims about work experiences may be used in hiring decisions by other users of the social networking system 100, in one embodiment, if the claims made about users are provided to employers requesting access to the claims. These claims may be captured as "notes" attached to a user's contact card. Notes may also use structured information, such as a ratings scale or a prompt asking "Would you recommend this person/service?" that may be associated with the subject agent.

Claims may also be used to determine whether an agent may be an expert in a topic, such as cooking, music, home décor, and sports, in one embodiment. For example, if multiple agents claim that a particular user is an expert at cooking, that particular user may be designated as an expert. An expert may be defined as a subject agent that has one or more claims by authoring agents having an assertion about a subject, where the assertion is the agent has an expertise in the subject. The level of expertise may be determined by the number of claims made about the subject agent as well as the strength of each assertion in the claims about the subject agent. The strength of an assertion may be determined by the social networking system 100 based on keywords, capitalization, fonts, and photographs used in making the claims. For example, the claim that "John is a GREAT cook" and others like it may reinforce the expert knowledge of John and cooking Similarly, the claim that "Betsy makes killer deviled eggs" that is posted with a picture of the deviled eggs, as well as social validation around the content post and other similar claims by others about Betsy's cooking provides credibility to the claim that Betsy is an expert cook. Meanwhile, if only one agent makes a claim about a subject user and their expertise and that agent has a high affinity for the subject user, the strength of the claim may be questionable. For example, if an authoring agent stated that "Michelle bakes yummy cookies" and there were no other claims about Michelle's cooking made by other agents, then the claim confidence for the assertion that Michelle is a good cook is relatively low. If that claim was made by an authoring agent that has a high affinity for Michelle, then the claim may have a discount, in one embodiment. Other content items, such as photos of food cooked, as well as the factors outlined above, including frequency of claims about cooking, total number of claims about the assertion, and implied claims based on trusted connections' claims, may be used in determining whether agents may be classified as an expert. As a result, claims made by an expert may have an "expert adjustment" such that the truth coefficients for claims made by the expert in the topic of their expertise have a higher truth coefficient than non-experts. Claims related to the expert's topic may be trusted more if they are made by an expert. For example, if an expert in cooking makes the claim that "Basil is the most important ingredient in spaghetti sauce," in an application for sharing recipes, then that claim may be given a higher trust coefficient, or truth coefficient, by the social networking system 100. In another embodiment, the trust coefficient may be increased based on the strength of the expertise of the expert which may be determined based on claims made about the expert in relation to the subject. In other words, a trust coefficient for the assertion that the agent is an expert may be determined based on claims made about the agent in relation to the assertion by other agents in the social networking system 100.

Derivative Claims

Derivative claims may also be generated by the social networking system 100 based on claims made by agents. Because the social networking system is included in the audience of every claim, the social networking system may generate derivative claims based on claims made by agents. For example, the social networking system may make a derivative claim that Bob claimed that Joe is an Expert at Cooking As a result, the social networking system may create a targeting cluster that includes all agents that are users that have been claimed to be Experts at Cooking for targeting advertisements about a new line of pots and pans. In this way, the derivative claim does not violate privacy settings of the author of the base claim.

Other types of derivative claims may be made by the social networking system 100 as well as agents on the social networking system 100 for other purposes, such as generating and publishing visualizations of claims on timelines of agents that help users read claims more efficiently and create more engagement around claims, insights that distill information across a set of agents that help agents better understand the activity on the social networking system 100, target messaging and advertising, and refine search. Derivative claims may not have audiences larger than the audiences indicated in the base claims to protect the privacy of agents. Derivative claims may also be generated and used by the social networking system 100 to improve the user experience of the social networking system 100. For example, an algorithm that determines a probability that a first user knows a second unconnected user on the social networking system 100 may generate a derivative claim based on claims about the first and second users, such as common friends, interests, groups, events, connections to entities, applications, and pages, as well as educational and work experience. The generated derivative claim may have a determined truth coefficient that may be factored into the algorithm that determines the probability that the first user knows the second unconnected user in the social networking system 100. Claims made about a particular user by agents in the social networking system 100 are associated with a user profile object for the particular user, in one embodiment.

Claims made about users, such as claims made by an application for taking orders for a Chinese restaurant, may be aggregated and used as a derivative claim for targeting advertisements to users based on the claims. For example, the social networking system may generate a derivative claim of all users that have ordered food from the Chinese restaurant in the past week, generate a targeting cluster of users based on the derivative claim, and enable advertisers to select that targeting cluster based on keywords or keyword phrases related to "Chinese food."

In addition to targeting advertisements, the social networking system may use derivative claims to enhance the experience of users and entities, such as generating better predictions of unconnected users that a viewing agent may know and wish to connect with, providing better photo recognition of subject agents tagged in photos based on derivative claims that aggregate all claimed tags of the subject agents, enabling a more relevant search algorithm to rank search results using derivative claims about the terms in the search query, generating visualizations of claims made about a subject agent in a timeline for the subject agent based on derivative claims, and so on.

Derivative claims may be generated by a social networking system 100 based on claims generated by users, entities, groups, and events on the social networking system 100. For example, a visualization claim may be generated by the social networking system 100 to capture the claims that were generated by all users of the social networking system 100 that are publicly available that are related to a response to a sudden death of a public figure, such as Steve Jobs. Visualizations may be published to a timeline of the subject agent based on the privacy control settings of the subject agent, in one embodiment. In another embodiment, visualizations may be published on the timeline of the subject agent upon receiving consent from the subject agent. In a further embodiment, visualizations may be made anonymous by aggregating the claims and generating a derivative claim based on the claims about the subject user. For example, a visualization of how many users claimed that Steve Jobs changed their lives may be posted on a page in the social networking system 100 for Steve Jobs based on claims made by users related to Steve Jobs.

Visualizations may be generated by the social networking system 100 as derivative claims to be posted on timelines of agents of the social networking system 100. A social networking system 100 may post a claim about an agent on the agent's timeline if the agent is a member of the audience for the claim and if the agent chooses to allow the post on their timeline. Any claim that the agent authored or in which they are referenced by a link or tag may be posted on the agent's timeline. A timeline may have four primary axes of representation: temporal, spatial, social (organized by social relationships using the signifier "with"), and categorical (e.g., favorite bars in SF, album of a trip to Europe). As another example of a post on an agent's timeline, the social networking system may generate a visualization of favorite bars visited in the last month based on check-in events of a subject user as well as other users connected to the subject user providing check-in information. Even if the subject user does not check-in to a bar, because his friends check-in to the bar with the subject user, that bar may move up the list in relevance in the favorite bars visualization. In another embodiment, rankings of the bars visited in the past year may be based on claims generated by external systems, such as third-party applications providing location information of the subject user. The social networking system 100 may generate a derivative claim based on the received check-in events and location information supplied by third-party applications that the subject user has favorite bars located in a certain area of the city. Time and date information may also be used to generate visualizations, such as favorite happy hour bars, based on claims made about the subject user. In yet another embodiment, a visualization may be generated based on claims made about all users in the local city location with similar demographics. In a further embodiment, a visualization may be generated using affinity score information of users as well as demographics. In yet another embodiment, the social networking system 100 may generate visualizations based on derivative claims for use in advertisements.

A social networking system 100 may generate derivative claims in order to generate truth coefficients and prompt a viewing agent for feedback without violating privacy control settings. In one embodiment, a social networking system 100 may generate one or more derivative claims based on multiple claims authored by agents about a subject. For example, the social networking system 100 may generate a derivative claim that Joe and Mary claim that Bob's mobile number is 123-456-7890 and that Peter and Paul claim that Bob's mobile number is 415-867-5309. The viewing agent, Sam, may claim that the number provided by Peter and Paul is Bob's mobile number. Each of the claims by Joe, Mary, Peter, and Paul may have one or more truth coefficients that exceed a minimum predetermined threshold of truthfulness because Bob may have more than one mobile number, such as a personal mobile number and a work mobile number. As a result, the viewing agent may be prompted to give feedback about the number claimed by Joe and Mary. If the viewing agent verifies that the number claimed by Joe and Mary is also a valid number, such as by adding that number into the viewing agent's address book or otherwise selecting that number, then the social networking system 100 may accord that number as being truthful, providing useful feedback to the social networking system 100 in calculating the truth coefficients for the two claims.

Browse Layer for Claims

A social networking system may also implement a claims browser user interface in which a viewing agent may search all claims that they can see, or any claim in which the viewing agent is a member of the audience on the social networking system. A claims browser user interface enables a viewing agent to submit a search query which may return an "exact match" for claims, such as "where does Sam say Sam attended school, who attended Harvard according to Harvard, and who says they like Lady Gaga." In this way, the "exact match" query provides a search result for specific claims made about the search terms in the query. In contrast, the claims browser may also enable a search query to perform a "best match" search, such as "who attended Harvard and who likes Lady Gaga." In that instance, the "best match" query returns a search result that may include other claims, in addition to specific claims matching the search terms, such as derivative claims generated by the social networking system as well as claims by authors other than the subject agent that are relevant to the search terms. For example, a subject agent may not specifically claim they attended Harvard, but the authoring agent Harvard may claim that the subject agent attended Harvard. Similarly, a subject agent may not specifically claim that they like Lady Gaga, but the social networking system may generate a derivative claim based on other claims made by the subject agent and other agents that indicate that the subject agent likes Lady Gaga, such as custom graph actions performed on custom graph objects including listening to songs by Lady Gaga, purchasing merchandise by Lady Gaga, and playing games associated with Lady Gaga. Other actions performed by other agents may also indicate an interest in Lady Gaga by the subject agent, such as being tagged in a photo at a Lady Gaga concert, a number of connected agents sharing content items about Lady Gaga, and viewing external websites connected to the social networking system that are relevant to Lady Gaga, where the viewing agent has opted in to sharing browsing information with the social networking system. As a result, the "best match" search may provide more relevant search results based on claims and predictions generated based on claims.

The search results may be "pushed" to a user when they change or become updated. A viewing agent that may want to know which connections are interested in Lady Gaga may be updated through a push notification on the social networking system or through another communications method, such as messages, chat, email, and the like. Claims searching may also be integrated with other products and services on the social networking system, such as automatically updating a dynamic ticker with search results of new users that have claimed to attend the same college or university as a viewing agent, newsfeed stories of "best match" claims that may be of interest to the viewing agent, and new applications that may utilize claims information about the viewing agent that may be presented via a suggestion or advertisement. The results of a claims query may be provided to a viewing agent through a website, on a mini web applet, a mobile device, or through an application programming interface (API). Notifications of when a definable event occurs, such as when a certain threshold number of claims is reached, may also be packaged and sold to customers wishing to receive the notifications.

Business Models Using Claims

In one embodiment, an author may pay the social networking system to boost the rankings of the author's claims in a query for "best match" claims. In another embodiment, an agent may pay the social networking system to boost a particular claim in the ranking for "best match" claims. In a further embodiment, an agent may define an exact, or "best match" set of agents to boost a particular claim such that the particular claim is boosted for that set of agents. In yet another embodiment, an agent may pay to boost classes of stories by others, based on historical claims and truth coefficient of an author.

In a further embodiment, a social networking system may pay agents for generating engagement and impressions of content on the social networking system. For example, agents may embed claim queries in any format on third-party applications and/or external systems that drive traffic and engagement to the social networking system. In addition, the embedded claim queries may help the social networking system optimize what content is provided to agents on the social networking system, such as through a news feed, notifications, rankings, and advertisements. The social networking system may also pay agents based on developing claims that provide more information to the social networking system to improve targeting as well as claim queries.

A social networking system may also be compensated for insights and/or feeds of information that third-party advertisers, developers, and administrators may want to process and monetize. For example, sophisticated claim queries may be formulated to enable an advertiser to identify users that may be having a baby in the near future. By providing timely information based on claims authored by agents on the social networking system, advertisers may use this information to better target users without sacrificing the privacy of the users.

Claims may also be integrated into existing services and features on the social networking system, such as connection requests between agents, adding elements to lists for display on an agent's profile, page, or application, and enabling applications to publish claims on behalf of an agent. For example, an initiating agent makes a claim that they are friends with a target agent. This claim has a privacy limit/audience set by the initiating agent. The claim is delivered to the target agent based on a "best match" claim query of "friendship requests target would be interested in." The social networking system may provide a simple interface for the target agent to claim friendship with the initiating agent. If both agents make reciprocal claims, then the privacy limit of the friendship is lifted. As another example, an agent may authorize an application to create a custom list on behalf of the agent. For example, a list of top food items ordered at a restaurant, based on claims made by agents as well as custom graph actions transmitted to the social networking system from a food ordering system, may be generated by the application and updated based on newer information. As a result, the application is generating derivative claims of the "top items" based on other claims made by agents or authorized by agents.

Address Book Using Claims

In a further embodiment, a stand-alone application may be created using claims generated within the social networking system 100. For example, a stand-alone address book application may enable synchronization of contact information for an agent's contacts, such as a user's friends and friends of friends. A synced claim may be passed by the social networking system 100 to a synced system external to the social networking system 100, such as one or more content delivery networks (CDNs), browser applications, third-party mobile address books, and a third-party contact management system. A user may enable third-party applications that manage the user's contacts to connect with the stand-alone address book application such that the third-party applications are agents making claims about the user's contacts' information, including phone numbers, email addresses, physical addresses, employers, titles, and so on. In one embodiment, particular types of contact information may be synced by the social networking system 100 based on agreements with the administrators of the third-party applications and/or synced systems. In another embodiment, agents may not be given the ability to prevent or limit syncing claims separately from defining the audiences of the claims. The stand-alone application may use the claim query functionality described above in searching claims for contacts. In this way, the stand-alone application is collaboratively maintained by all agents making claims about contact information for target users and/or entities. The stand-alone application may also be implemented on an external system on the Internet, as well as an m-site implementation and on native iOS and Android applications. The stand-alone address book application may be integrated into various chat, email, and messaging platforms, such as FireFly Talk, Facebook Messaging, Gmail, Yahoo Mail, Outlook, Hotmail, and the like. Based on claim queries, such as "best match" claim queries, the stand-alone address application may suggest improvements and changes to claims made by an agent. No privacy settings can prevent an agent from adding information to their address book, provided by the stand-alone address application, as long as the information is accessible to the agent. Other agents cannot override an authoring agent's claims without the explicit consent of the authoring agent.

The stand-alone application may enable an agent to perform actions on claims, or attributes, listed on a contact card, such as call, email, message, and invite. From the stand-alone application, the viewing agent may call a phone number claimed for a target agent. Notes may also be attached to a contact card for a target agent. Reviews are a special type of note that may be attached to a contact card that includes more structure, such as a rating of the contact, a response to the question "Would recommend?," optional questions provided by entities associated with the contact card, such as "Is this restaurant romantic" or "Was the service good?," a free text field, and an audience selector. A history may be attached to a contact card, displaying an audit trail related to the card. Logged events include attribute changes and actions. The stand-alone application may be initially populated with an agent's existing connections on the social networking system, including existing connections to users and liked pages.

Missing attributes may be automatically filled with "best guess" claims from contacts and friends. "Best guess" claims may be derivative claims generated based on claims made by agents on the social networking system 100. When conflicting changes are made to a contact's attributes by the contact or by connected users, the agent may be notified of the change inline on the card and prompted with whether the agent would like to update the contact card accordingly. Missing attributes may also be requested from the contact or from mutual friends by the agent. If the requestee sends the contact information and the information is already in the stand-alone application, then the audience of the contact information is increased to the previous audience plus the requestor. If the contact information did not previously exist in the stand-alone application, then the requestee is asked to fill in the contact information (i.e., generate a claim) and assign an audience to the new claim which must include the requestor. Contact cards may be shared with a recipient. A shared contact card includes all of the author's claims and any claims to which the recipient has access. In one embodiment, a viewing agent may ask other agents connected to the viewing agent in the social networking system, through the stand-alone application, for contact information about a target contact. For example, contact information of a contact, "Joe Schmo," such as his mobile phone number, may be asked by a viewer of the stand-alone application running the application on an iOS device. The viewer may select one or more connections on the social networking system who may know "Joe Schmo." In one embodiment, the social networking system may search for agents that are connected to the viewer on the social networking system as well as the target contact "Joe Schmo" and list the results. In another embodiment, the viewer may simply query the stand-alone application for the contact information of "Joe Schmo," even if the viewer is not connected to Joe Schmo in the real world. The results of the query may result in the contact information, if the viewer is in the audience of the claims that include the contact information. In a further embodiment, the results of the query may result in a prompt to one or more connections of the viewer that are also connected to the target contact to share the requested contact information with the viewer.

The stand-alone application may automatically generate a claim based on an action by an agent. For example, if a viewing agent uses a source agent's claim, such as making a phone call, e-mailing an agent, and getting directions to an agent's house, then the source agent's claim is copied with the viewing agent making the claim and a default privacy setting, or audience, of just the viewing agent. These claims may be "bolded" in the stand-alone application or otherwise highlighted to indicate the automatic generation of these claims. The viewing agent may later assign a new audience for these types of claims.

Within the stand-alone application, a viewing agent may view claims made by other agents about a particular contact, such as a mobile number for the contact. A viewing agent may select multiple claims for the mobile number of a contact based on the claims made by other agents and selected multiple check boxes. In doing so, the viewing agent is claiming that the contact has more than one mobile number and may re-label each mobile number with a different name, such as personal mobile and work mobile. A viewing agent may also copy a claim for a mobile number into a new claim, according to whether the author of the claim has enabled the viewing agent to copy the claim through the one or more copyright bits. For example, an authoring agent may represent a company with numerous sales contacts, including names, emails, and phone numbers. The authoring agent may wish to import the numerous sales contacts into the stand-alone application such that the audience of the sales contacts is limited to the authoring agent and a relatively few number of other agents, such as sales team members. In that instance, the authoring agent may enable the audience of the other sales team agents to copy the claim into a new claim.

The stand-alone application may also, in one embodiment, operate on the social networking system 100, such that the social networking system 100 may provide a service to agents requesting information about a specific person, such as whether the specific person is trustworthy, non-malicious, and the like. The social networking system 100 may also, while respecting the privacy of authoring agents, enable agents of the social networking system 100 to sell access to information to each other. This business model would enable agents to modify the one or more copyright bits to include other agents that have paid for access to the information included in the claims authored by the agents. In this instance, paid access to claims would produce claims that are not copyable, but only viewable by the paying agents where the claims which access was paid for automatically modify the audiences of the claims to include the paying agents. For some types of information, such as sensitive data, an agent that imports such information to the stand-alone application or pays for access to such information may be responsible for ensuring that the privacy of the subject agents is maintained.

In a further embodiment, a claim may only be authored by an agent if the agent was paid to make the claim. For example, an agent may only check-in at a restaurant if the agent were paid to make that claim. The social networking system may provide a marketplace or auction through which agents may offer their claim authoring abilities to other agents in exchange for a payment. By checking into the restaurant, the agent will broadcast the claim that the agent is at the restaurant to other agents connected to the authoring agent. In another embodiment, the social networking system may provide a premium service to validate whether an agent is a real person, a real entity, or has a valid email address. Users of the validation service may make a payment, such as a one-time payment or a subscription method of payment, in exchange for validation of an agent, by name or email address.

In other embodiments, the social networking system may record top-level domain names of websites visited by agents of the social networking system and store those visits as custom graph actions and custom graph objects in an activity log on the social networking system. In this way, the social networking system may generate derivative claims about agents of the social networking system to identify top websites visited by the agents over a certain time period. Because agents are generating the original claim by visiting the websites, the website visiting agents are owner agents of the claims generated by visiting the websites and may remove the visits and block visits from being recorded in the activity log, in one embodiment.

Business Models and Functionality Using the Claim and Warehouse Layers

A social networking system 100 may monetize the storage capability of the warehouse layer by providing a software-as-a-service (SaaS) social graph to potential customers. In one embodiment, raw storage may be sold at the warehouse level and a SaaS social graph may also be sold at the claim layer, utilizing the identity model of the claim layer. In another embodiment, "cloud file-conversion" as a service may also be provided by the social networking system 100, enabling customers to convert their files in a distributed computing environment enabled by the warehouse layer.

The social networking system 100 may leverage its role as a participant in the claim layer by authoring claims as an agent and as an application. The social networking system 100 may aggregate insights, such as publishing anonymous trends to various audiences, including advertisers. The social networking system 100 may also merge various objects by generating "equality" claims, or claims signifying that two objects are equivalent. This helps to increase efficiency. Other agents may also generate equality claims, such as identifying products by barcodes, uniform product codes (UPCs), or other identifiers. A social networking system 100 may also generate suggestions to specific agents, such as suggestions to connect with other agents (people you may know) where each claim has an audience that only includes each specified agent.

A social networking system 100 may also generate claims to identify real users with authenticated identities based on email address verification. These claims may then be packaged as a list of authenticated identities and sold via APIs to advertisers and/or third parties. The social networking system 100 may also act as a proxy to enable a third party to match contact information of users with user identifiers using a hashed identifier provided by the social networking system 100. The social networking system 100 may ensure the integrity of the privacy model by acting as a proxy between potential customers and the agents of the social networking system 100. A social networking system 100 may also utilize any of the above-mentioned business models provided to other agents and/or applications in the social networking system 100.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing a first content item in a binary storage of an online social networking system, the first content item stored among a plurality of content items in the binary storage;
    generating a first object that represents the first content item;
    storing the first object among a plurality of objects in a graph database of the online social networking system;
    receiving a first claim from an authoring agent of the online social networking system, where the first claim:
        comprises a first assertion made by the authoring agent referencing the stored first object representing the first content item; and
        specifies a first audience for the first claim comprising one or more users of the online social networking system;
    storing the first claim in the graph database as a connection to the stored first object representing the first content item;
    receiving, from an owner agent associated with the first content item, a copyright setting for the first content item of the plurality of content items, the copyright setting specifying whether other users of the online social networking system may include a reference to the stored first object in a new claim;
    sending, from the online social networking system to a viewing agent who is in the first audience, a description of the first assertion of the first claim by the authoring agent, where the description references the stored first object representing the first content item and is sent via a first user interface of the online social networking system;
    receiving a request from the viewing agent to make a second claim that:
        comprises a second assertion referencing the stored first object representing the first content item; and
        specifies a second audience for the second claim comprising one or more users of the online social networking system;
    determining, by a processor, based on the copyright setting whether the viewing agent is authorized to include a reference to the stored first object representing the first content item into the second claim;
    responsive to determining that the viewing agent is authorized to include a reference to the stored first object representing the first content item into the second claim, storing the second claim in the graph database as a connection to the stored first object representing the first content item; and sending, from the social networking system to one or more users in the second audience, a description of the second assertion of the second claim by the viewing agent, where the description references the first content item and is sent via a second user interface of the online social networking system.

2. The method of claim 1, wherein the copyright setting for the first content item is determined by an owner agent by receiving a selection of a flag for the copyright setting for the first content item by the owner agent through an interface on the social networking system.

3. The method of claim 1, wherein the copyright setting for the first content item further comprises a user-payload-copyright setting and wherein the viewing agent is included in the audience of the claim.

4. The method of claim 1, wherein the copyright setting for the first content item further comprises an application-copyright setting and wherein the viewing agent further comprises an application authorized to copy the claim on behalf of a member of the audience of the claim.

5. The method of claim 1, further comprising:

receiving an indication that a viewing agent of the social networking system is viewing the claim, further comprising receiving an indication that the viewing agent is viewing the claim on the social networking system.

6. The method of claim 1, further comprising: receiving an indication that a viewing agent of the social networking system is viewing the claim, further comprising receiving an indication that the viewing agent is accessing the claim through an application programming interface connected with the social networking system.

7. The method of claim 1, further comprising:

providing a link for display to the viewing agent in the social networking system, where selection of the link generates a command to the social networking system to copy a reference to the claim.

8. The method of claim 1, further comprising:

providing an application programming interface (API) to the viewing agent in the social networking system for copying a reference to the claim.

\* \* \* \* \*